US011461062B2

(12) United States Patent
Adachi et al.

(10) Patent No.: US 11,461,062 B2
(45) Date of Patent: Oct. 4, 2022

(54) PRINTING DEVICE AND SERVER TO RECEIVE AN E-MAIL INCLUDING AN ATTACHED PRINT DATA AND DETERMINE WHETHER SENDER E-MAIL ADDRESS IS STORED IN A TABLE IN WHICH A USER ID AND E-MAIL ADDRESS ARE REGISTERED IN ASSOCIATION WITH EACH OTHER

(71) Applicant: BROTHER KOGYO KABUSHIKI KAISHA, Nagoya (JP)

(72) Inventors: Toyoshi Adachi, Kakamigahara (JP); Yuichiro Sakuragi, Ichinomiya (JP); Yutaka Urakawa, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/104,032

(22) Filed: Nov. 25, 2020

(65) Prior Publication Data

US 2021/0165617 A1   Jun. 3, 2021

(30) Foreign Application Priority Data

Nov. 29, 2019 (JP) .............................. JP2019-216049
Aug. 31, 2020 (JP) .............................. JP2020-145771

(51) Int. Cl.
*G06F 3/12* (2006.01)
*G06F 21/60* (2013.01)
(Continued)

(52) U.S. Cl.
CPC .......... *G06F 3/1238* (2013.01); *G06F 3/1222* (2013.01); *G06F 3/1285* (2013.01);
(Continued)

(58) Field of Classification Search
None
See application file for complete search history.

(56) References Cited

U.S. PATENT DOCUMENTS

2001/0017712 A1   8/2001   Kasatani
2007/0239690 A1*  10/2007  Matsuda ............ H04N 1/00347
                                             707/999.005
(Continued)

FOREIGN PATENT DOCUMENTS

| JP | 2001-306446 A | 11/2001 |
| JP | 2003-099215 A | 4/2003 |
| JP | 2014-056438 A | 3/2014 |

*Primary Examiner* — Haris Sabah
(74) *Attorney, Agent, or Firm* — Scully, Scott, Murphy & Presser, PC

(57) ABSTRACT

A printing device may include: a printing unit configured to print an image, a communication interface; an input unit to which user information is inputted; a memory; and a controller configured to access a table in which user information and an e-mail address are registered in association with each other. The controller may be configured to: receive an e-mail to which attached data is attached; in a case where the e-mail is received, determine whether a sender e-mail address of the e-mail is in the table; in a case where it is determined that the sender e-mail address is in the table, obtain user information associated with the sender e-mail address from the table and store the attached data in the memory; authenticate the user information; and cause the printing unit to print the attached data.

23 Claims, 23 Drawing Sheets

(51) Int. Cl.
*H04L 51/42* (2022.01)
*H04L 101/37* (2022.01)

(52) U.S. Cl.
CPC ............ *G06F 21/608* (2013.01); *H04L 51/42* (2022.05); *G06F 3/1231* (2013.01); *H04L 2101/37* (2022.05)

(56) References Cited

U.S. PATENT DOCUMENTS

| | | | |
|---|---|---|---|
| 2008/0295166 A1 | 11/2008 | Kasatani | |
| 2012/0188600 A1* | 7/2012 | Oshima | G06F 3/1205 358/1.15 |
| 2013/0242335 A1* | 9/2013 | Naitoh | G06F 3/1238 358/1.14 |
| 2013/0335771 A1* | 12/2013 | Sugiura | G06F 3/1274 358/1.14 |
| 2019/0364159 A1* | 11/2019 | Sae | G06F 3/1292 |

\* cited by examiner

FIG. 2A

Table  TB1

| User ID | PIN | E-Mail Address |
|---|---|---|
| user_a | 1111 | user1@xxx.co.jp |
| user_b | 2222 | user2@xxx.co.jp |
| user_c | 3333 | - |

FIG. 2B

Provisional Registration Table  TB2

| User ID | File Name | Candidate Flag | Candidate E-Mail Address |
|---|---|---|---|
| user_a | file1.pdf | NO | - |
| user_c | file3.pdf | YES | user3@xxx.co.jp |

(Second Embodiment Case A)

PRINTING DEVICE AND SERVER TO RECEIVE AN E-MAIL INCLUDING AN ATTACHED PRINT DATA AND DETERMINE WHETHER SENDER E-MAIL ADDRESS IS STORED IN A TABLE IN WHICH A USER ID AND E-MAIL ADDRESS ARE REGISTERED IN ASSOCIATION WITH EACH OTHER

CROSS-REFERENCE TO RELATED APPLICATION

This application claims priority to Japanese Patent Application No. 2019-216049, filed on Nov. 29, 2019 and Japanese Patent Application No. 2020-145771, filed on Aug. 31, 2020, the entire contents of which are hereby incorporated by reference into the present application.

TECHNICAL FIELD

The disclosure herein discloses a technique related to a printing device and a server.

BACKGROUND

An output terminal which is configured to receive an e-mail including print data sent from a computer of a user and capable of printing the print data in the received e-mail is conventionally known. In this technique, when the user inputs an e-mail address in the output terminal, the print data of the e-mail which the user had sent to the output terminal is printed in the output terminal.

SUMMARY

The disclosure herein provides art to enhance security in a situation where an image represented by attached data that is attached to an e-mail is to be printed.

A printing device may comprise: a printing unit configured to print an image on a recording medium; a communication interface; an input unit to which user information including a user ID and a password is inputted; and a memory configured to store attached data; and a controller configured to access a table in which user information and an e-mail address are registered in association with each other, wherein the controller is configured to: receive an e-mail to which attached data is attached via the communication interface; in a case where the e-mail is received via the communication interface, determine whether a sender e-mail address of the e-mail is in the table; in a case where it is determined that the sender e-mail address is in the table, obtain user information associated with the sender e-mail address from the table and store the attached data in the memory in association with the obtained user information; authenticate the user information which is inputted to the input unit; and cause the printing unit to print the attached data, the attached data being stored in the memory in association with the authenticated user information.

Another printing device disclosed herein may comprise: a printing unit configured to print an image on a recording medium; a communication interface; an input unit to which user information including a user ID and a password is inputted; and a controller, wherein the controller is configured to: in a case where an e-mail to which attached data representing a target image to be printed is attached is received by a server, receive a print instruction from the server via the communication interface, the print instruction including a sender e-mail address of the e-mail and first relation information related to the attached data; in a case where the print instruction is received, determine whether the sender e-mail address included in the print instruction is in a table in which user information and an e-mail address are registered in association with each other; and in a case where it is determined that the sender e-mail address is in the table and inputted user information which is inputted to the input unit is identical to registered user information which is registered in the table in association with the sender e-mail address, cause the printing unit to print the target image which is represented by the attached data related to the first relation information included in the print instruction.

A server disclosed herein may comprise: a communication interface; and a controller, wherein the controller is configured to: receive an e-mail to which attached data representing a target image to be printed is attached via the communication interface; in a case where the e-mail is received, determine whether a sender e-mail address of the e-mail is in a table in which user information and an e-mail address are registered in association with each other; and in a case where it is determined that the sender e-mail address is in the table, send a first print instruction including first relation information related to the attached data to a printing device via the communication interface, the first print instruction being for causing the printing device to print the target data represented by the attached data related to the first relation information in a case where inputted user information inputted to the printing device is identical to registered user information registered in the table in association with the sender e-mail address.

Another server disclosed herein may comprise: a communication interface; and a controller, wherein the controller is configured to: receive an e-mail to which attached data representing a target image to be printed is attached via the communication interface; in a case where the e-mail is received, determine whether a sender e-mail address of the e-mail is in a table in which user information and an e-mail address are registered in association with each other; and in a case where it is determined that the sender e-mail address is in the table and inputted user information inputted to the printing device is identical to registered user information registered in the table in association with the sender e-mail address, send a first print instruction including first relation information related to the attached data to the printing device via the communication interface, the first print instruction being for causing the printing device to print the target data represented by the attached data related to the first relation information.

Methods implemented by the printing device and the server, computer programs for the printing device and the server and a non-transitory computer-readable medium storing computer-readable instructions for the printing device and the server are also novel and useful. Moreover, a communication system comprising the above printing device, the server, and another device (e.g. a communication device) is also novel and useful.

BRIEF DESCRIPTION OF DRAWINGS

FIG. 2A shows information registered in a table;
FIG. 2B shows information registered in a provisional registration table.

DETAILED DESCRIPTION

Figure 1:
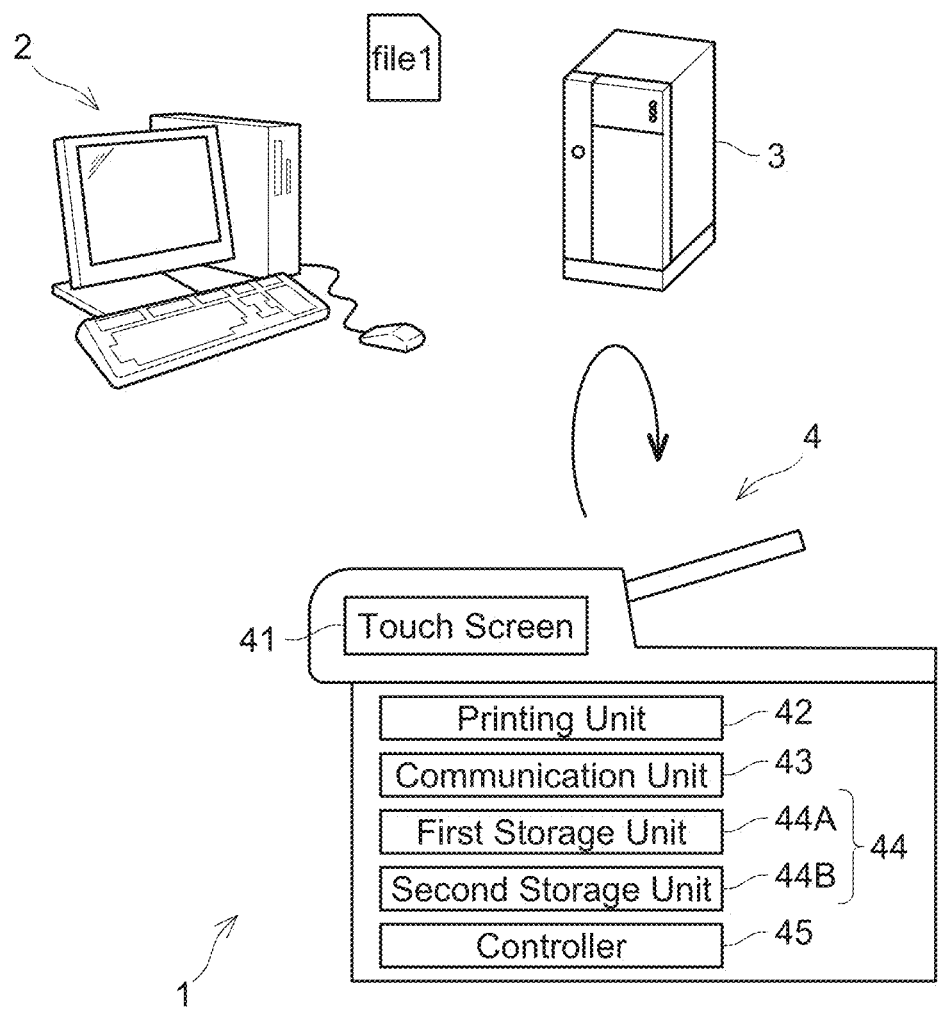
FIG. 1 shows a printing system of a first embodiment.

Next, embodiments of the disclosure herein will be described in detail with suitable reference to the drawings. As shown in FIG. 1, a printing system 1 includes a plurality of terminals 2, an e-mail server 3, and a printing device 4. It should be noted that for the sake of simplicity, FIG. 1 shows one of the terminals 2.

Each terminal 2 includes a CPU, a ROM, a RAM, a rewritable nonvolatile memory, and the like. Each terminal 2 is configured to communicate with the e-mail server 3 via the Internet and the like. Each terminal 2 is configured to send an e-mail to the e-mail server 3. Each terminal 2 is a computer, a tablet-type portable terminal, or the like.

The e-mail server 3 includes a CPU, a ROM, a RAM, a rewritable nonvolatile memory, and the like. The e-mail server 3 is configured to communicate with the plurality of terminals 2 and the printing device 4. The e-mail server 3 is configured to store e-mails sent from the terminals 2 and send, when requested by another terminal including the printing device 4, corresponding one of the stored e-mails to the other terminal.

The printing device 4 is a device configured to print an image on a recording medium such as paper. The printing device 4 also has functions such as FAX, copy, and scan. The printing device 4 is provided with a touch screen 41 as an example of an input unit and a display unit, a printing unit 42, a communication unit 43 as an example of a communication interface, a storage unit 44 as an example of a memory, and a controller 45.

The touch screen 41 has a function of displaying an image and a function of accepting input of various types of information when a user touches a button displayed in the image. Specifically, the touch screen 41 is configured to accept input of user information including a user ID and a password. Information inputted to the touch screen 41 is outputted to the controller 45.

The printing unit 42 has a function of printing an image on a recording medium such as paper. The printing unit 42 is provided with a photoreceptor, a charger, an exposure unit, a developer, a transfer unit, a fuser, and the like. The charger has a function of charging the photoreceptor. The exposure unit has a function of exposing the photoreceptor and forming an electrostatic latent image on the photoreceptor. The developer has a function of supplying toner to the electrostatic latent image on the photoreceptor and forming a toner image on the photoreceptor. The transfer unit has a function of transferring the toner image on the photoreceptor onto the recording medium. The fuser has a function of fusing the toner image on the recording medium.

The communication unit 43 has a function of receiving an e-mail to which an attached file being an example of attached data is attached. The communication unit 43 may be a LAN interface for receiving an e-mail or a modem to which a telecommunication line is connected and configured to send and receive FAX. More specifically, the controller 45 inquires of the e-mail server 3 at a predetermined cycle whether an e-mail having an e-mail address of the printing device 4 as its recipient is in the e-mail server 3. In a case where an e-mail having the e-mail address of the printing device 4 as the recipient is in the e-mail server 3, the controller 45 receives the e-mail from the e-mail server 3 via the communication unit 43.

The storage unit 44 is provided with a first storage unit 44A and a second storage unit 44B.

The first storage unit 44A is a rewritable nonvolatile memory. A local database is set in the first storage unit 44A. As shown in FIG. 2A, the local database stores a table TB1 in which user information and an e-mail address can be registered. The user information includes a user ID and a Personal Identification Number (PIN) code being an example of a password. The respective information (user ID, PIN code) registered as the user information and the e-mail address are registered in the table TB1 in association with each other.

Specifically, for a first user whose user ID is "user_a", the user ID and the PIN code are associated with each other and registered in the table TB1 as user information of the first user, and the e-mail address is associated with the user information of the first user. Similarly, for a second user whose user ID is "user_b", the user ID and the PIN code are associated with each other and registered in the table TB1 as user information of the second user, and the e-mail address is associated with the user information of the second user. For a third user whose user ID is "user_c", the e-mail address is not registered yet, but the user ID and the PIN code are associated with each other and registered in the table TB1 as user information of the third user.

Here, the user information is basically registered in the table TB1 by an administrator of the local database. In the present embodiment, a user other than the administrator, more specifically, a user who has been authenticated by the printing device 4, can additionally register an e-mail address in association with user information that has been authenticated, by operating the printing device 4.

The second storage unit 44B is a volatile RAM. A provisional registration table TB2 that is shown in FIG. 2B and is different from the table TB1 is set (stored) in the second storage unit 44B. The second storage unit 44B is configured to store an attached file attached to an e-mail.

The controller 45 is a CPU configured to operate according to a program stored in the ROM. The controller 45 is configured to access the storage unit 44.

The controller 45 has a function of executing a first determination process, a storage process, an authentication process, a print process, a second determination process, and a registration process.

The first determination process is a process of, when the communication unit 43 receives an e-mail with an attached file, analyzing this e-mail and determining whether or not a sender e-mail address (From) of the e-mail is in the table TB1. The storage process is a process of, in a case where it is determined in the first determination process that the sender e-mail address is in the table TB1, obtaining the user information associated with the sender e-mail address from the table TB1 and storing the attached file in association with the obtained user information in the second storage unit 44B.

The authentication process is a process of authenticating user information inputted through the touch screen 41. Specifically in the authentication process, the controller 45 determines whether a user ID and a PIN code inputted through the touch screen 41 are identical to any of the user IDs and the PIN codes stored in the table TB1.

The print process is a process of printing the attached file stored in the second storage unit 44B in association with the user information that has been authenticated in the authentication process, by using the printing unit 42.

The second determination process is a process of, in a case where it is determined in the first determination process that the sender e-mail address is not in the table TB1, determining whether or not a subject (Subject) of the e-mail is identical to any of the user information registered in the table TB1. More specifically, in the second determination process, the controller 45 determines whether or not a user ID included in the subject of the e-mail is identical to any of the user IDs registered in the table TB1.

The registration process is a process of, in a case where it is determined in the second determination process that the subject of the e-mail is identical to one of the user IDs, storing the user ID identical to the subject, the sender e-mail address, and the attached file in the storage unit 44 in association with each other. The registration process includes a provisional registration process (an example of "register the user information including the user ID included in the subject, the sender e-mail address, and the attached data in a provisional registration table in the memory"), a display process (an example of "display a first screen on the display unit"), and a registration process (an example of "register the sender e-mail address registered in the provisional registration table in the table in association with the authenticated user information").

The provisional registration process is a process of, in the case where it is determined in the second determination process that the subject of the e-mail is identical to one of the user IDs, storing in the provisional registration table TB2 the user ID identical to the subject, the sender e-mail address, and the attached file in association with each other. More specifically, in the provisional registration process, the controller 45 registers the sender e-mail address in the provisional registration table TB2 as an e-mail address being a candidate to be registered in the table TB1. Further, in the provisional registration process, the controller 45 registers a file name of the attached file in the provisional registration table TB2 and further stores the attached file in a storage area in the second storage unit 44B that is different from the provisional registration table TB2.

Figure 7:
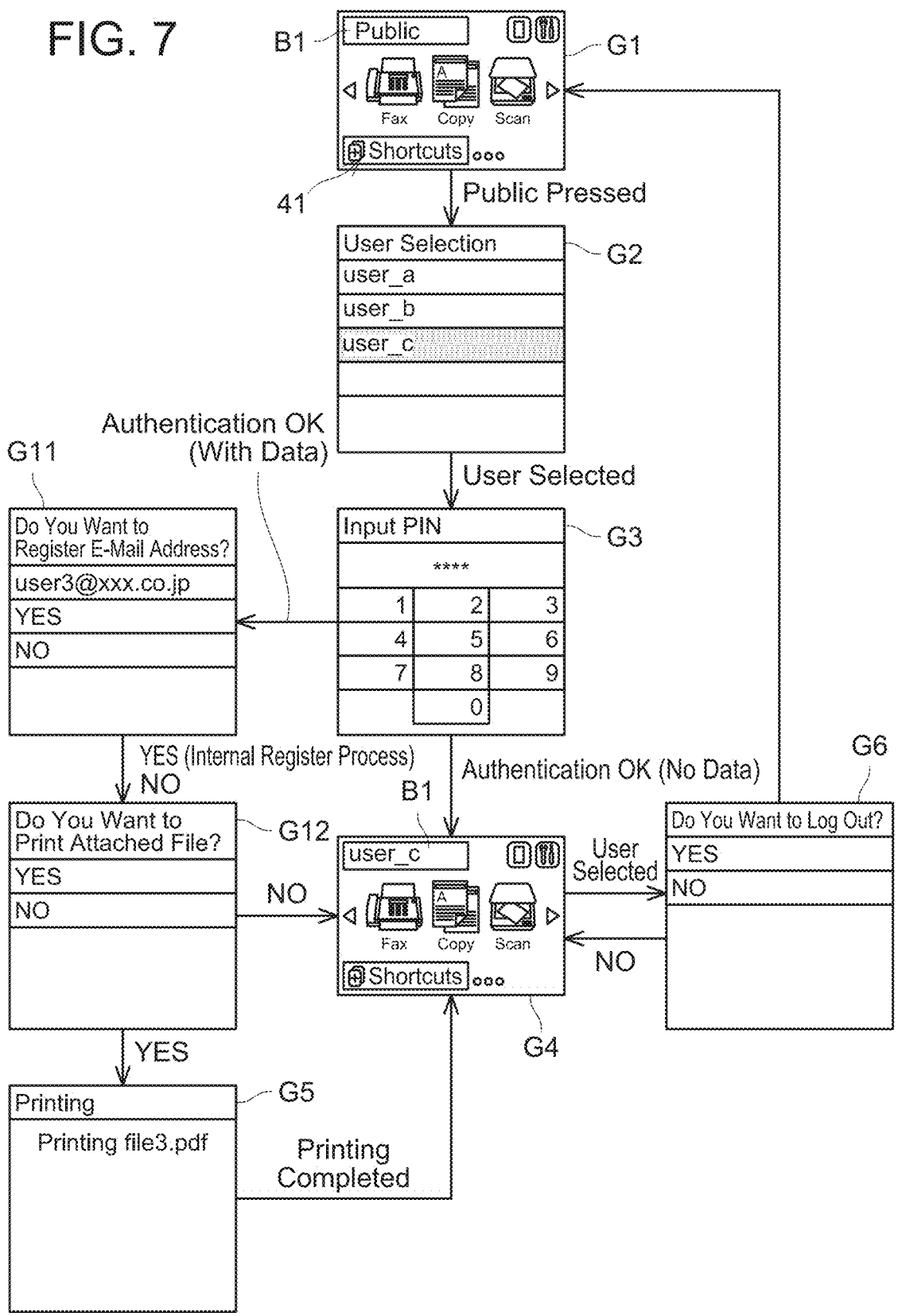
FIG. 7 shows a transition of screens on the touch screen when a third user whose e-mail address is not registered yet in the table logs into the printing device.

The display process is a process of, in a case where the user ID authenticated in the authentication process is identical to one of the user IDs stored in the provisional registration table TB2, displaying, on the touch screen 41, a screen for selecting whether or not to register in the table TB1 the sender e-mail address stored in the provisional registration table TB2 (see an address registration screen G11 of FIG. 7).

The registration process is a process of, in a case where information indicating that the sender e-mail address is to be registered in the table TB1 (YES) is inputted to the touch screen 41 in the aforementioned address registration screen G11 (see FIG. 7), registering in the table TB1 the sender e-mail address associated with the user information in the provisional registration table TB2 in association with the user information authenticated in the authentication process.

Further, the controller 45 has a function of, in a case of determining in the second determination process that the subject of the e-mail is not identical to any of the user IDs, deleting the e-mail and the attached file attached to this e-mail.

Further, the controller 45 has a function of displaying, on the touch screen 41, a screen for selecting whether or not to print the attached file associated with the user ID authenticated in the authentication process without registering the sender e-mail address in the table TB1 (see a print selection screen G12 of FIG. 7) in a case where information indicating that the sender e-mail address stored in the provisional registration table TB2 is not to be registered in the table TB1 (NO) is inputted to the aforementioned address registration screen G11 (see FIG. 7) on the touch screen 41. Further, the controller 45 has a function of printing the attached file using the printing unit 42 in a case where information indicating that the attached file is to be printed (YES) is inputted to the aforementioned print selection screen G12 on the touch screen 41.

Figure 3:
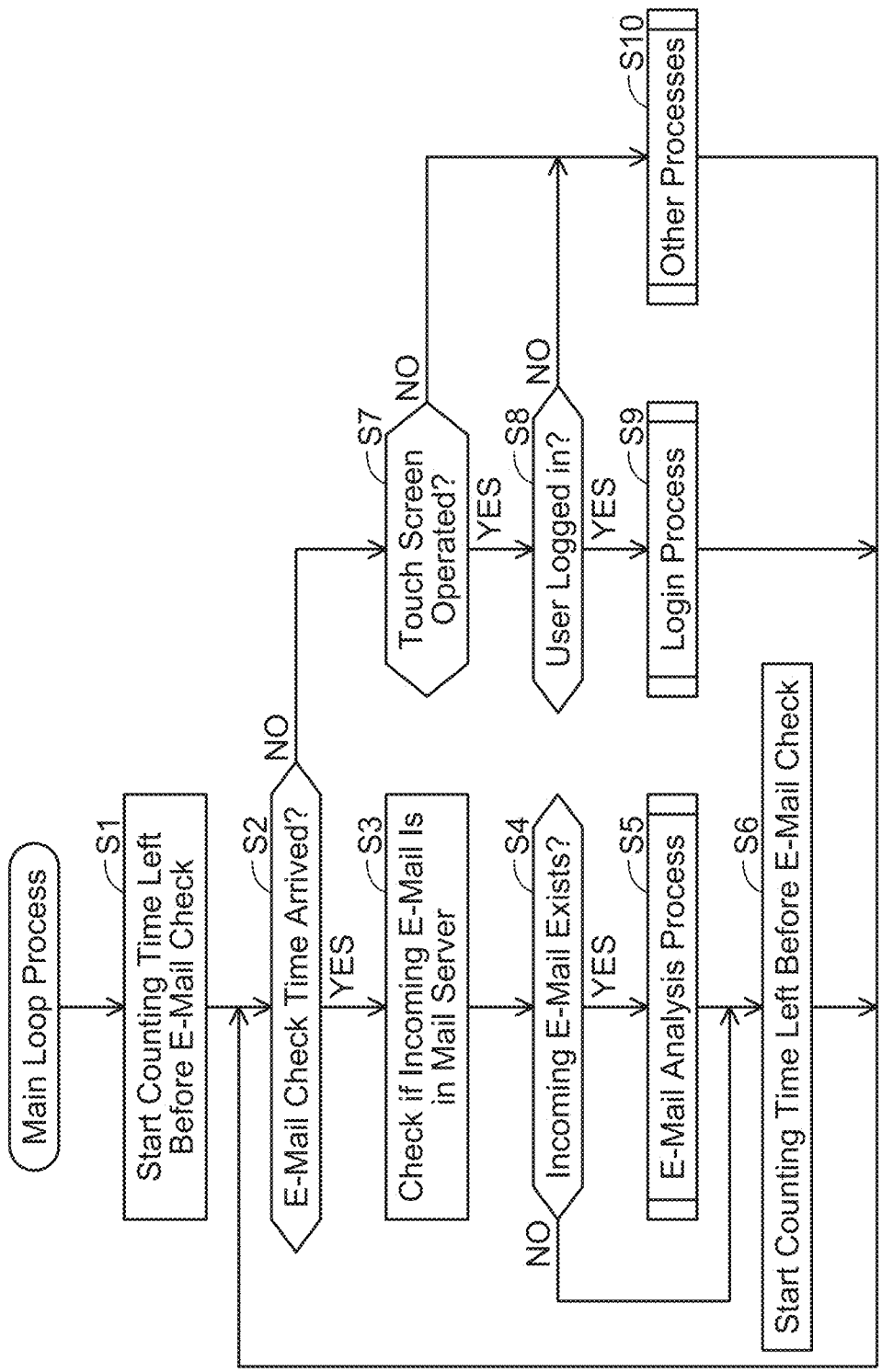
FIG. 3 is a flowchart showing a main loop process.

Next, details of operations of the controller 45 will be described with reference to flowcharts of FIGS. 3 to 5. The controller 45 repeatedly executes a main loop process shown in FIG. 3.

In the main loop process, the controller 45 firstly starts counting time that is left before an e-mail check (S1). Here, the e-mail check is a process of inquiring of the e-mail server 3 whether an e-mail having an e-mail address of the printing device 4 as its recipient (hereinbelow may be termed "incoming e-mail") is in the e-mail server 3. The e-mail check is executed at a predetermined cycle.

After step S1, the controller 45 determines whether or not time to execute the e-mail check has arrived (S2). In a case of determining in step S2 that the time to execute the e-mail check has arrived (Yes), the controller 45 checks whether there is an incoming e-mail in the e-mail server 3 (S3). More specifically, in step S3, the controller 45 accesses a predetermined e-mail box in the e-mail server 3 allocated for the printing device 4.

After step S3, the controller 45 determines whether there is an incoming e-mail that has not been received yet in the e-mail server 3 (S4). In a case of determining in step S4 that there is an incoming e-mail that has not been received yet (Yes), the controller 45 receives the incoming e-mail that has not been received yet and executes an e-mail analysis process (S5). The e-mail analysis process will be described later in detail.

After step S5 or in a case of determining No in step S4, the controller 45 starts counting time that is left before another e-mail check (S6). After step S6, the controller 45 returns to the process of step S2.

In a case of determining in step S2 that the time to execute the e-mail check has not yet arrived (No), the controller 45 determines whether the touch screen 41 has been operated (S7). In a case of determining in step S7 that the touch screen 41 has been operated (Yes), the controller 45 determines whether or not the operation performed on the touch screen 41 is an operation for logging into the printing device 4 (S8).

In a case of determining in step S8 that the operation performed on the touch screen 41 is the operation for logging into the printing device 4 (Yes), the controller 45 executes a login process (S9). The login process will be described later in detail. After step S9, the controller 45 returns to the process of step S2.

In a case of determining in step S7 that the touch screen 41 has not been operated (No) or in a case of determining in step S8 that the user has not logged in (No), the controller 45 executes another process (S10) and returns to the process of step S2. Here, the other process may be exemplified as a process of printing a FAX which the printing device 4 received by using the printing unit 42.

Figure 4:
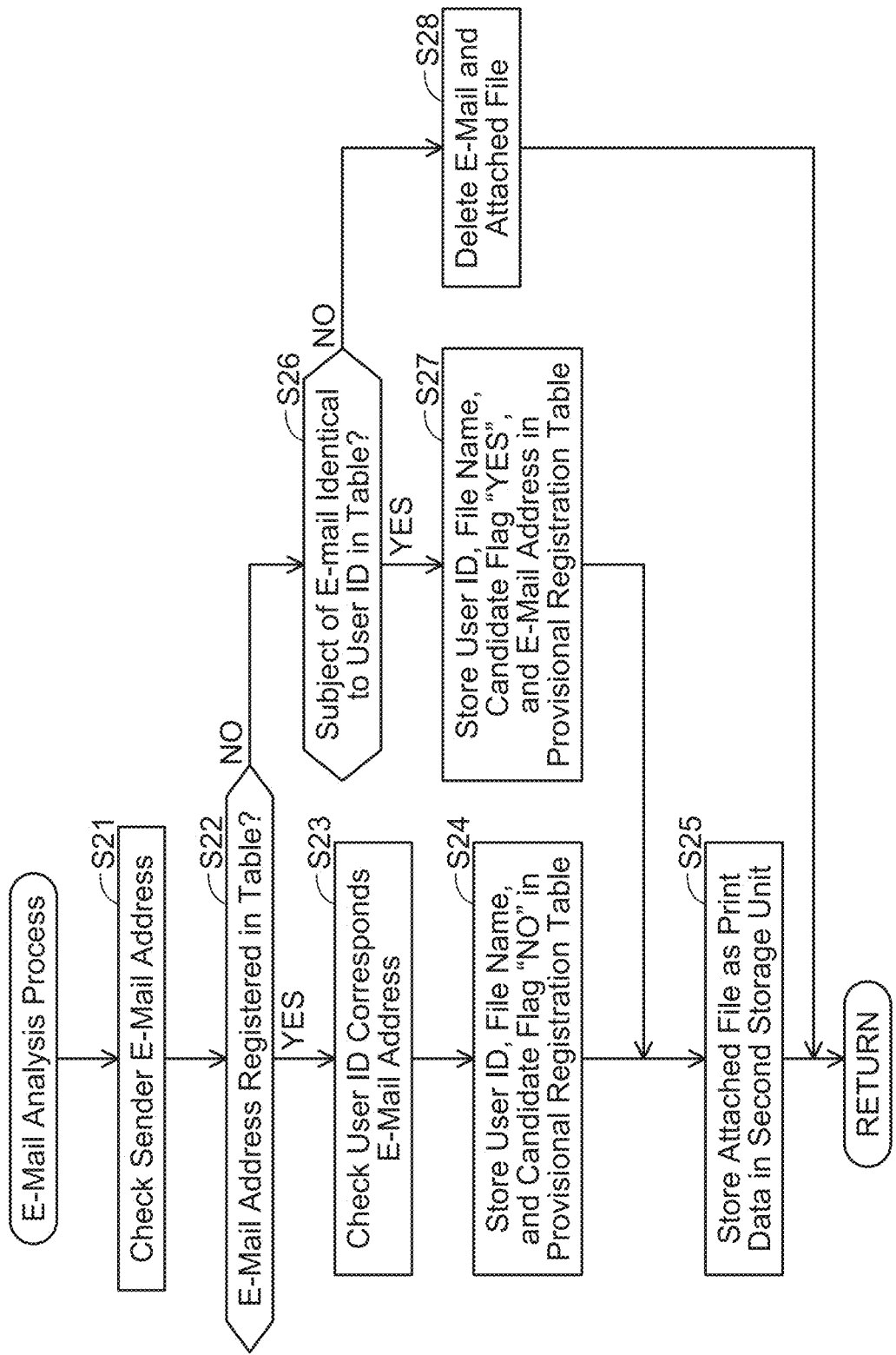
FIG. 4 is a flowchart showing an e-mail analysis process.

As shown in FIG. 4, in the e-mail analysis process, the controller 45 firstly checks a sender e-mail address of the incoming e-mail (S21). More specifically in step S21, the controller 45 obtains the sender e-mail address from the incoming e-mail.

After step S21, the controller 45 determines whether or not the obtained sender e-mail address is identical to any of the e-mail addresses registered in the table TB1 (S22). The process of step S22 is the aforementioned first determination process.

In a case of determining in step S22 that the sender e-mail address is identical to one of the e-mail addresses in the table TB1, that is, in a case of determining that the sender e-mail address is already registered in the table TB1 (Yes), the controller 45 checks, more specifically, obtains, the user ID corresponding to the e-mail address in the table TB1 identical to the sender e-mail address (S23).

After step S23, the controller 45 stores the user ID obtained in step S23, the file name of the attached file corresponding to the sender e-mail address obtained in step S21, and a candidate flag "NO" in the provisional registration table TB2 (S24).

The candidate flag is a flag for designating the sender e-mail address as a candidate to be registered in the table TB1. In a case where the candidate flag is YES (more specifically, "1"), this indicates that the sender e-mail address is designated as a candidate to be registered in the table TB1. In a case where the candidate flag is NO (more specifically, "0"), this indicates that the sender e-mail address is not designated as a candidate to be registered in the table TB1.

After step S24, the controller 45 stores in the second storage unit 44B, as print data, the attached file corresponding to the sender e-mail address obtained in step S21 in association with information such as the file name and the user ID registered in the provisional registration table TB2 (S25). The process of step S25 is the aforementioned storage process. After step S25, the controller 45 returns to the main loop process (RETURN).

In a case of determining in step S22 that the sender e-mail address is not identical to any of the e-mail addresses in the table TB1, that is, in a case of determining that the sender e-mail address is not registered yet in the table TB1 (No), the controller 45 determines whether or not the subject of the e-mail is identical to any one of the user IDs in the table TB1 (S26). The process of step S26 is the aforementioned second determination process.

In a case of determining in step S26 that the subject is identical to one of the user IDs in the table TB1 (Yes), the controller 45 stores the user ID obtained in step S23, the sender e-mail address obtained in step S21, the file name of the attached file corresponding to this sender e-mail address, and the candidate flag "YES" in the provisional registered table TB2 (S27). The process of step S27 is the aforementioned provisional registration process. After step S27, the controller 45 proceeds to the process of step S25.

In a case of determining in step S26 that the subject is not identical to any of the user IDs in the table TB1 (No), the controller 45 deletes the e-mail and the attached file attached to this e-mail (S28). After step S28, the controller 45 returns to the main loop process (RETURN).

Figure 5:
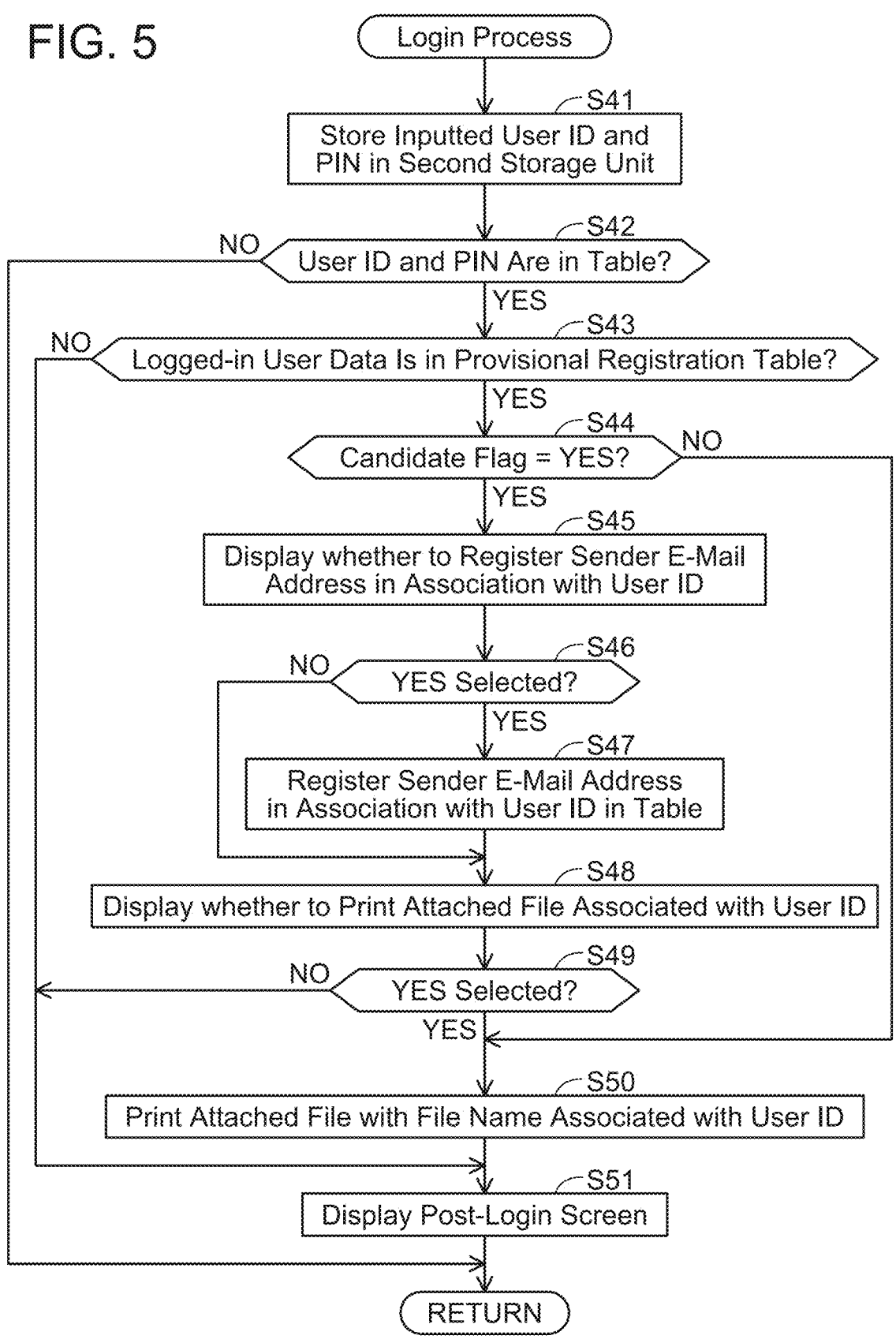
FIG. 5 is a flowchart showing a login process.

As shown in FIG. 5, in the login process, the controller 45 firstly retains (stores) a user ID and a PIN code inputted through the touch screen 41 in the second storage unit 44B (S41). After step S41, the controller 45 determines whether or not the user ID and the PIN code inputted through the touch screen 41 are in the table TB1 (S42). The process of step S42 is the aforementioned authentication process.

In a case of determining in step S42 that at least one of the user ID or the PIN code is not in the table TB1 (No), the controller 45 displays an error display indicating that the PIN code is incorrect or the like on the touch screen 41 and thereafter returns to the main loop process (RETURN). In a case of determining in step S42 that the user ID and the PIN code are in the table TB1 (Yes), the controller 45 determines whether or not data of the logged-in user is registered in the provisional registration table TB2 (S43). More specifically in step S43, the controller 45 determines whether or not the user ID identical to the authenticated ID, the file name associated with this user ID, and the sender e-mail address associated with this user ID are registered in the provisional registration table TB2.

In a case of determining in step S43 that the data of the logged-in user is registered in the provisional registration table TB2 (Yes), the controller 45 determines whether or not the candidate flag in this user data is "YES" (S44). In a case of determining in step S44 that the candidate flag is "YES" (Yes), the controller 45 displays, on the touch screen 41, an address registration screen G11 (see FIG. 7) for selecting whether or not to register in the table TB1 the sender e-mail address, which is registered in the provisional registration table TB2, in association with the authenticated user ID touch screen (S45). The process of step S45 is the aforementioned display process.

After step S45, the controller 45 determines whether or not YES was selected in the address registration screen G11 (S46). In a case of determining in step S46 that YES was selected (Yes), the controller 45 registers in the table TB1 the sender e-mail address registered in the provisional registration table TB2 in association with the authenticated user ID (S47) and proceeds to a process of step S48. The process of step S47 is the aforementioned registration process. In a case of determining in step S46 that NO was selected (No), the controller 45 skips step S47, that is, the controller 45 does not execute the registration process and proceeds to the process of step S48.

In step S48, the controller 45 displays, on the touch screen 41, a print selection screen G12 (see FIG. 7) for selecting whether or not to print the attached file with the file name associated with the authenticated user ID (S48). After step S48, the controller 45 determines whether or not YES was selected in the print selection screen G12 (S49).

In a case of determining in step S49 that YES was selected (Yes), the controller 45 prints the attached file with the file name associated with the authenticated user ID (S50). Step S50 is the aforementioned print process. In the print process, the controller 45 displays a print-in-progress screen G5 (see FIG. 7) on the touch screen 41.

In a case of determining in step S44 that the candidate flag is NO (No), the controller 45 skips steps S45 to S49 and proceeds to the process of step S50. That is, in the case where the candidate flag is NO, the controller 45 executes the print process (S50) immediately without executing the registration process or the process for selecting whether or not to print.

After the print process (S50), the controller 45 displays a post-login screen G4 (see FIG. 7) on the touch screen 41 (S51). In a case of determining in step S49 that NO was selected (No), the controller 45 displays the post-login screen G4 on the touch screen 41 without executing the print process (S51).

In a case of determining in step S43 that the data of the logged-in user is not registered in the provisional registration table TB2 (No), the controller 45 skips steps S44 to S50 and displays the post-login screen G4 on the touch screen 41 (S51). After step S51, the controller 45 returns to the main loop process (RETURN).

Next, specific examples of the operations of the controller 45 will be described. Firstly, the operations of the controller 45 in a case where the first user whose user ID is "user_a" is to use the printing device 4 will be described. As shown in FIG. 2A, an e-mail address of the first user is already registered in the table TB1 in association with the user ID "user_a" and a PIN code "1111" of the first user.

As shown in FIG. 1, when the first user sends an e-mail having an attached file with a file name "file1.pdf" from his/her terminal 2 to the printing device 4, the e-mail and the attached file are stored in the e-mail server 3. The controller 45 of the printing device 4 receives the e-mail and the attached file which the first user had sent by accessing the e-mail server 3 at the predetermined cycle.

When receiving the e-mail and the attached file of the first user, the controller 45 executes the e-mail analysis process shown in FIG. 4. Since the e-mail address of the first user is already registered in the table TB1, the controller 45 determines Yes in the process of step S22 of the e-mail analysis process. After this, as shown in FIG. 2B, the controller 45 stores, in the provisional registration table TB2, the user ID "user_a" of the first user, the file name "file1.pdf" of the attached file attached to the e-mail of the first user, and the candidate flag "NO" (S24). Then, the controller 45 stores the attached file attached to the e-mail of the first user in the second storage unit 44B in association with the file name and the user ID (S25).

Figure 6:
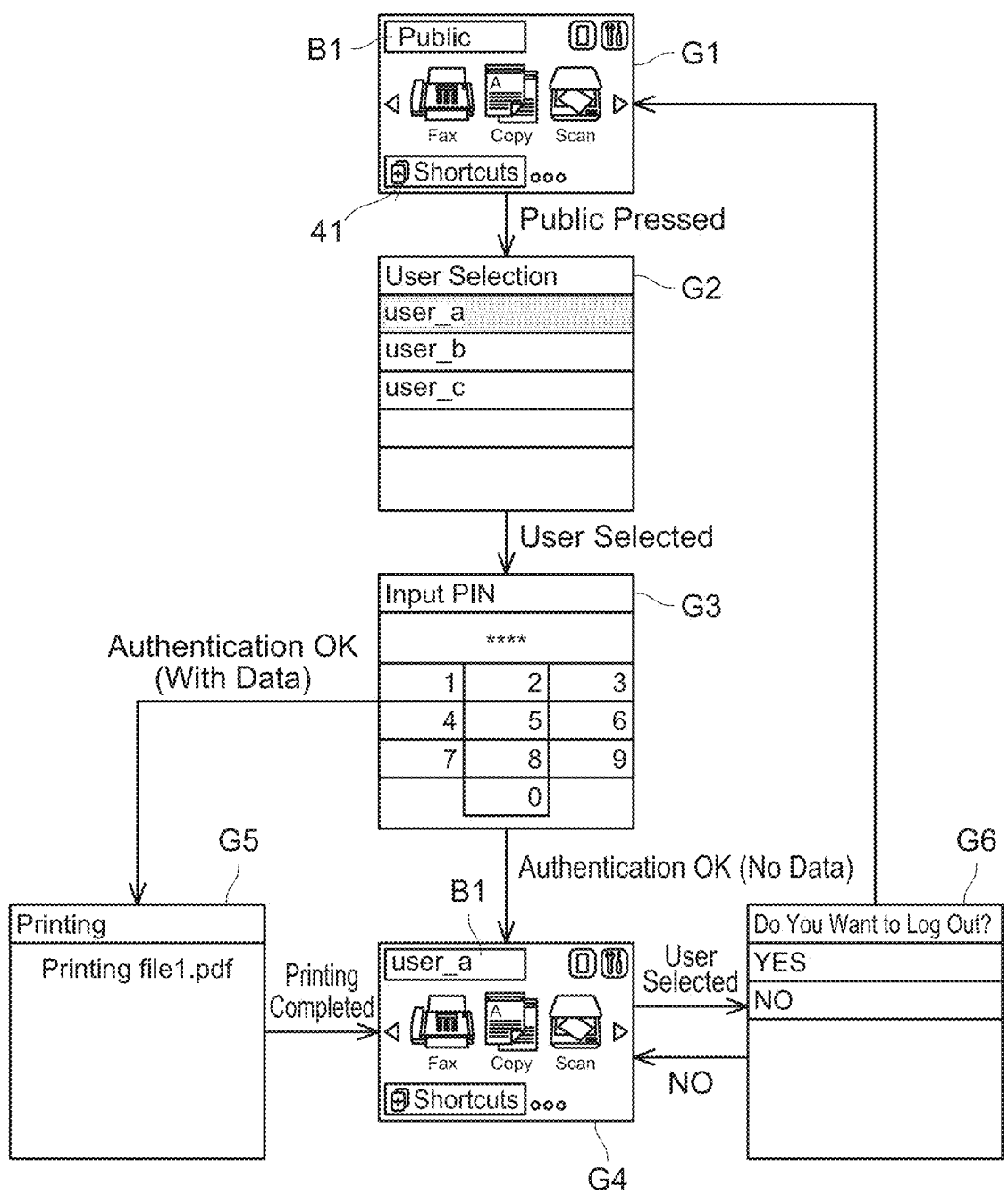
FIG. 6 shows a transition of screens on a touch screen when a first user whose e-mail address is already registered in the table logs into a printing device.

As shown in FIG. 6, when none of the users are logged in, the controller 45 displays a pre-login screen G1 on the touch screen 41. When the first user selects a user selection button B1 displayed by a character string "public" in the pre-login screen G1, the controller 45 displays a user selection screen G2 on the touch screen 41.

More specifically, in the user selection screen G2, the controller 45 displays a list of a plurality of user IDs stored in the table TB1 on the touch screen 41. The first user inputs the user ID "user_a" to the touch screen 41 by selecting his/her user ID "user_a" from the list displayed on the touch screen 41. Due to this, the controller 45 determines that the user ID "user_a" in the table TB1 is identical to the user ID "user_a" the user has, and displays on the touch screen 41 a PIN input screen G3 for inputting a PIN code.

When the user inputs his/her own PIN code "1111" to the PIN input screen G3, the controller 45 determines that the inputted PIN code "1111" is identical to the PIN code "1111" associated with the user ID "user_a" in the table TB1, and determines 'authentication OK'.

In a case of determining 'authentication OK', the controller 45 determines whether or not data related to the authenticated user ID "user_a" is already registered in the provisional registration table TB2 (S43 of FIG. 5). In a case where the data related to the authenticated user ID "user_a" is not registered yet in the provisional registration table TB2, the controller 45 displays the post-login screen G4 on the touch screen 41 (S43: No→S51).

In a case where the data related to the authenticated user ID "user_a" is already registered in the provisional registration table TB2, the controller 45 determines whether the candidate flag is "YES" (S44). Since the candidate flag corresponding to the first user is set in "NO", the controller 45 determines No in step S44 and immediately executes the print process (S50). In the print process, the controller 45 displays the print-in-progress screen G5 on the touch screen 41.

When the print process is completed, the controller 45 displays the post-login screen G4 on the touch screen 41. When the first user selects a user selection button B1 displayed by a character string "user_a" in the post-login screen G4, the controller 45 displays a logout selection screen G6 on the touch screen 41.

When the first user selects YES in the logout selection screen G6, the controller 45 displays the pre-login screen G1 on the touch screen 41. When the first user selects NO in the logout selection screen G6, the controller 45 displays the post-login selection screen G4 on the touch screen 41. In a case of not accepting any input to the touch screen 41 over a predetermined time with the post-login screen G4 displayed on the touch screen 41, the controller 45 displays the pre-login screen G1 on the touch screen 41.

Next, the operations of the controller 45 in a case where the third user whose user ID is "user_c" is to use the printing device 4 will be described. As shown in FIG. 2A, an e-mail address of the third user is not registered yet in the table TB1, and only the user ID "user_c" and a PIN code "3333" are already registered in the table TB1 in association with each other.

As shown in FIG. 1, when the third user inputs the user ID "user_c" of the third user in a subject of an e-mail and sends the e-mail having an attached file with a file name "file3.pdf" from his/her terminal 2 to the printing device 4, the e-mail and the attached file are stored in the e-mail server 3. The controller 45 of the printing device 4 receives the e-mail and the attached file which the third user had sent by accessing the e-mail server 3 at the predetermined cycle.

When receiving the e-mail and the attached file of the third user, the controller 45 executes the e-mail analysis process shown in FIG. 4. Since the e-mail address of the third user is not registered yet in the table TB1, the controller 45 determines No in the process of step S22 of the e-mail analysis process. After this, in step S26, the controller 45 determines that the subject of the e-mail of the third user is identical to one of the user IDs in the table TB1 since the user ID "user_c" is included in the subject of the e-mail of the third user.

After this, as shown in FIG. 2B, the controller 45 stores in the provisional registration table TB2 the user ID "user_c" of the third user, the file name "file3.pdf" of the attached file attached to the e-mail of the third user, the candidate flag "YES", and an e-mail address "user3@xxx.co.jp" of the e-mail (S27). Then, the controller 45 stores the attached file attached to the e-mail of the third user in the second storage unit 44B in association with the file name, the user ID, and the like (S25).

As shown in FIG. 7, when the third user selects his/her user ID "user_c" in the user selection screen G2 and inputs his/her PIN code "3333" in the PIN input screen G3, the controller 45 determines 'authentication OK'. In a case of determining 'authentication OK', the controller 45 further determines whether or not data related to the authenticated user ID "user_c" is registered in the provisional registration table TB2 (S43 of FIG. 5).

In a case where the data related to the authenticated user ID "user_c" is registered in the provisional registration table TB2, the controller 45 determines whether or not the candidate flag is YES (S44). Since the candidate flag corresponding to the third user is set in "YES", the controller 45 determines Yes in step S44 and displays the address registration screen G11 on the touch screen 41 (S45).

When the third user selects YES in the address registration screen G11, the controller 45 executes the registration process to register in the table TB1 the e-mail address of the third user registered in the provisional registration table TB2 and then displays the print selection screen G12 on the touch screen 41. When the third user selects NO in the address registration screen G11, the controller 45 displays the print selection screen G12 on the touch screen 41 without executing the registration process.

When the third user selects YES in the print selection screen G12, the controller 45 displays the print-in-progress screen G5 on the touch screen 41 and executes the print process. When the third user selects NO in the print selection screen G12, the controller 45 displays the post-login screen G4 on the touch screen 41 without executing the print process.

According to the above, the following effects can be obtained in the present embodiment. In the embodiment, the attached data of the e-mail associated with the user ID can be printed by inputting the user ID and the PIN code. The user ID and the PIN code are information not known by others. Thus, security can be enhanced as compared to a case where the e-mail address alone is inputted.

Simply by inputting a user ID in the subject of an e-mail and sending the e-mail, even a user whose e-mail address is not registered in the table TB1 can print attached data attached to the e-mail.

Since the user is prompted to select whether to register the sender e-mail address in the table TB1, the registration of the sender e-mail address in the table TB1 can be selected as the user wishes. For example, in a case where a user borrowed another person's personal computer and sent attached data to the printing device 4 using a sender e-mail address of this other person, the user can select not to register the e-mail address of the other person.

Even in a case where it is selected in the address registration screen G11 that the e-mail address is not to be registered, the print selection screen G12 is thereafter displayed on the touch screen 41. Therefore, for example, in a case where attached file is sent using an e-mail with an e-mail address that is not in regular use, only printing of the attached file can be executed without registering the e-mail address.

The disclosure herein is not limited to the foregoing embodiment, and may be utilized in various configurations as exemplified below. In the description below, members having substantially the same structures as the members in the foregoing embodiment will be given the same reference signs, and descriptions thereof will be omitted.

Figure 8:
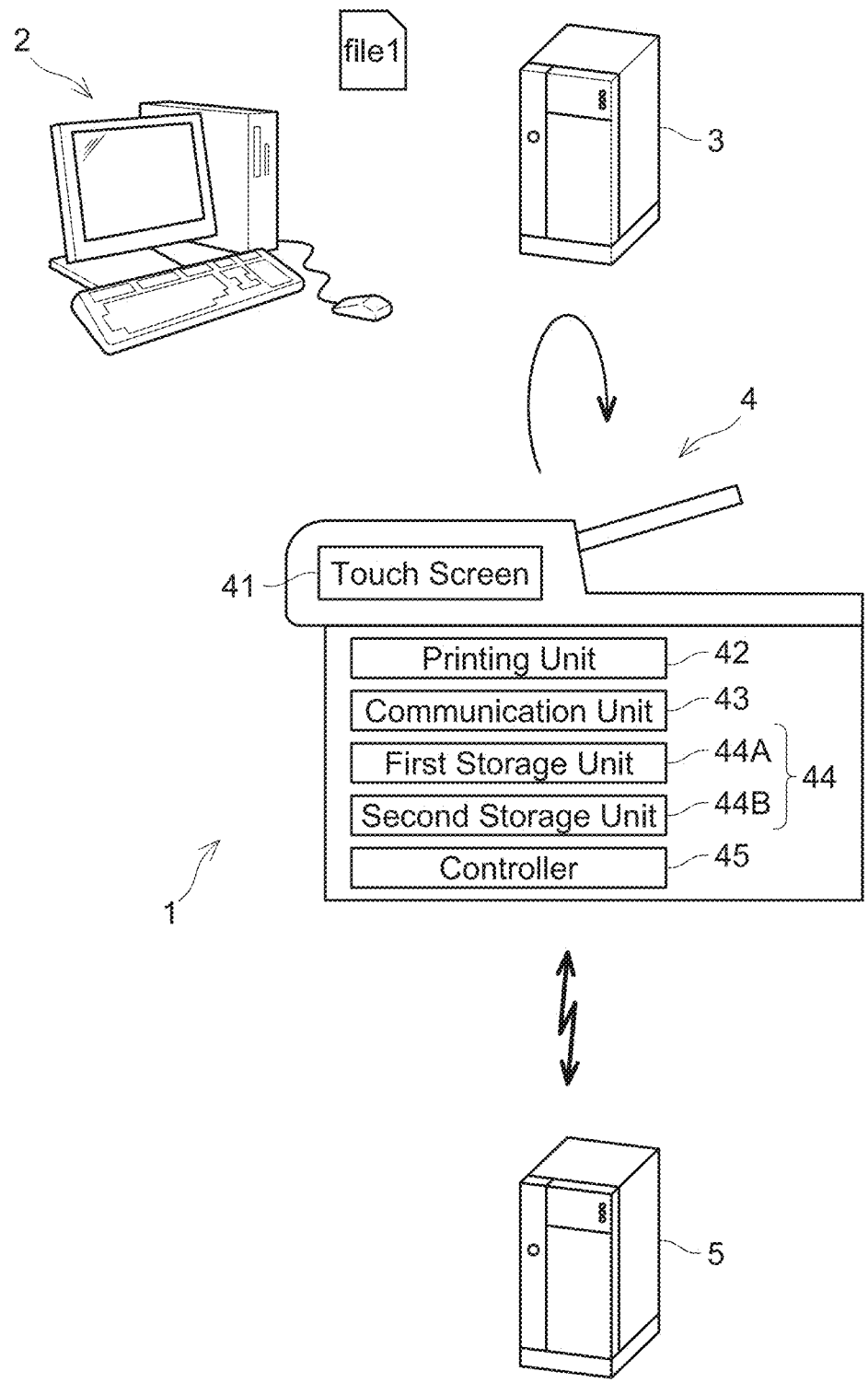
FIG. 8 shows a variant of the printing system.

In the above embodiment, the table TB1 is stored in the first storage unit 44A of the printing device 4, however, the disclosure herein is not limited to this. For example, as shown in FIG. 8, the table TB1 may be stored in a server 5 configured to communicate with the printing device 4.

In the above embodiment, the touch screen 41 exemplifies the input unit and the display unit, however, the disclosure herein is not limited to this. The display unit may be a liquid crystal panel not having a touch input function, and the input unit may be a mechanical button provided around the liquid crystal panel.

Respective elements explained in the above embodiment and variants may be carried out in various combinations.

Second Embodiment

Figure 9:
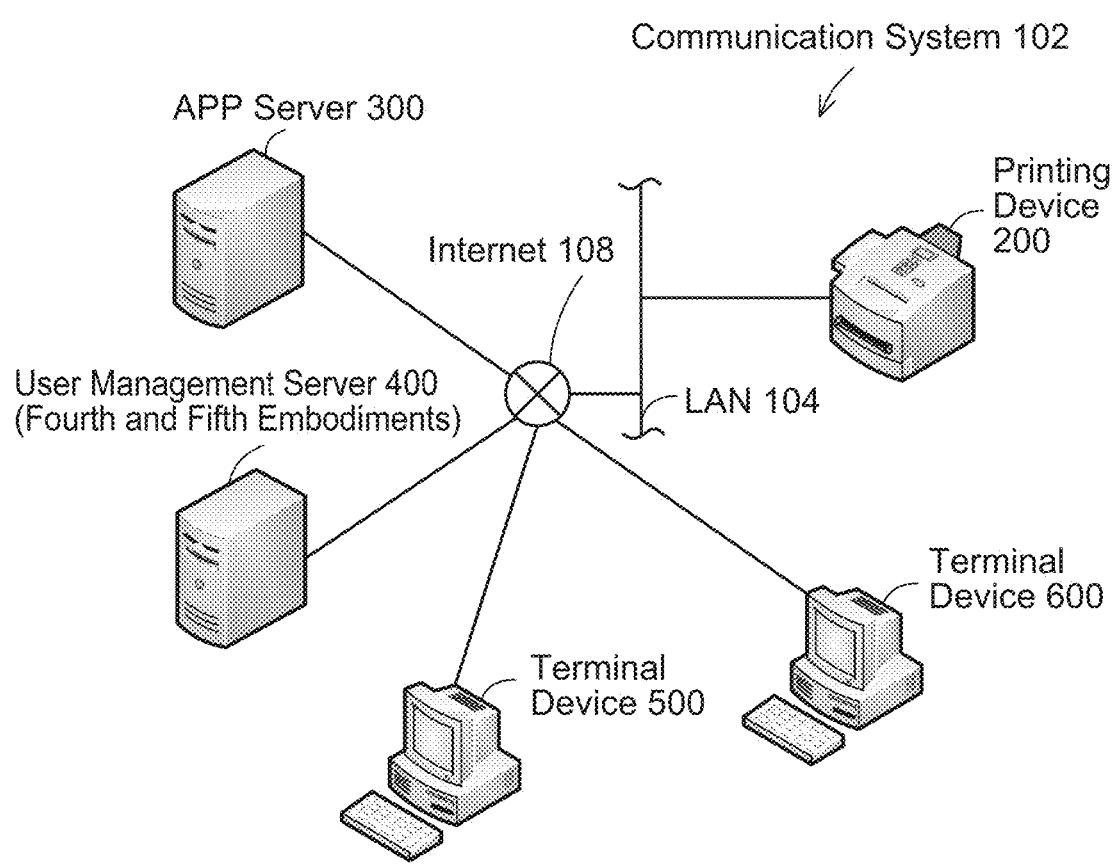
FIG. 9 shows a configuration of a communication system.

Configuration of Communication System 102; FIG. 9

As shown in FIG. 9, a communication system 102 is provided with a printing device 200, an application (APP) server 300, and terminal devices 500, 600. The APP server 300 and the terminal devices 500, 600 are connected to the Internet 108, and are configured to communicate with each other via the Internet 108. The printing device 200 is connected to a Local Area Network (LAN) 104. The LAN 104 is connected to the Internet 108. The printing device 200 is configured to communicate with the respective devices 300, 500, 600 via the LAN 104 and the Internet 108. The LAN 104 may be a wired LAN or a wireless LAN.

Figure 10:
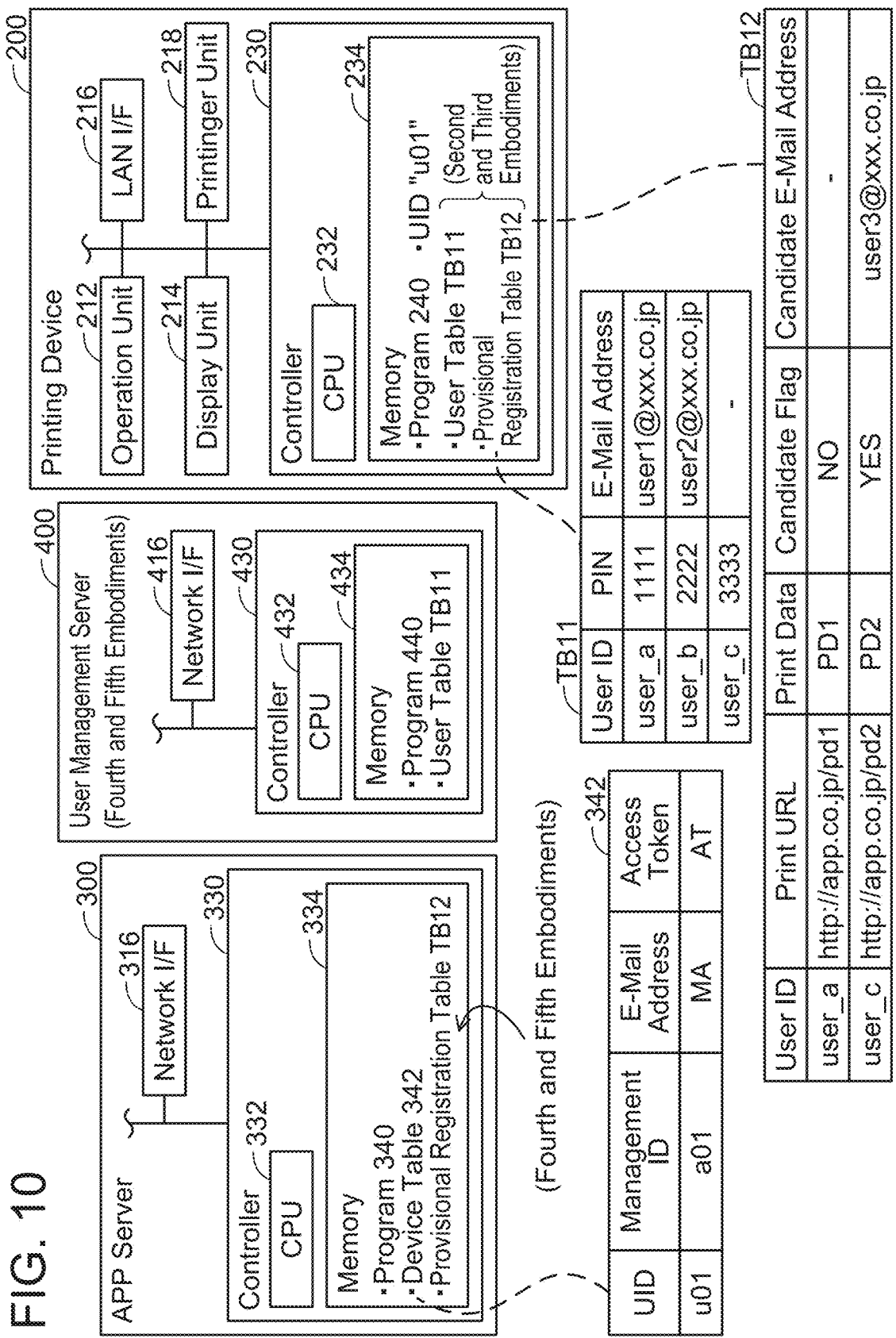
FIG. 10 is a block diagram showing configurations of respective devices in the communication system.

Configuration of APP Server 300; FIG. 10

The APP server 300 is a server configured to execute communication for e-mail print with a printing device (e.g., 200). The e-mail print is a function of causing the printing device to print an image represented by image data attached to an e-mail. The APP server 300 is provided on the Internet 108 by a vendor of the printing device 200.

The APP server 300 is configured to establish an eXtensible Messaging and Presence Protocol (XMPP) session with the printing device (e.g., 200). In a variant, a server different from the APP server 300 may establish the XMPP session with the printing device. In this case, the APP server 300 and the different server cooperate to execute communication for e-mail print with the printing device. The XMPP session is a session of a so-called full-time connection. By using the XMPP session, the APP server 300 can send requests to the printing device over a firewall of the LAN to which the printing device belongs (e.g., a firewall set by a router) without receiving requests from the printing device. That is, the XMPP session is a session that enables server-push communication. The XMPP session is kept established until power of the printing device is turned off.

The APP server 300 is provided with a network interface 316 and a controller 330. The respective units 316, 330 are connected to a bus line (reference sign omitted). Hereinbelow, an interface will be denoted "I/F". The network I/F 316 is connected to the Internet 108 (see FIG. 9). The controller 330 is provided with a CPU 332 and a memory 334. The CPU 332 is configured to execute various processes according to a program 340 stored in the memory 334. The memory 334 stores a device table 342 as well as the program 340 as above.

The device table 342 is a table in which information related to printing devices is registered. The device table 342 stores, for each of a plurality of printing devices, a UID obtained from the printing device, a management ID for managing the printing device, an e-mail address for causing the printing device to execute the e-mail print, and an access token of the printing device in association with each other. The access token is authentication information for establishing an XMPP session with the printing device.

Configuration of Printing Device 200

The printing device 200 is a peripheral device configured to execute a print function. (i.e., a peripheral device of a terminal device connected to the LAN 104). The printing device 200 may be a multi-function device configured to execute a scan function, a facsimile function, and the like as well as the print function. The printing device 200 is provided with an operation unit 212, a display unit 214, a LAN I/F 216, a printing unit 218, and a controller 230. The respective units 212 to 230 are connected to a bus line (reference sign omitted).

The operation unit 212 is provided with a plurality of keys. A user can input various instructions to the printing device 200 by operating the operation unit 212. The display unit 214 is a display configured to display various types of information. The display unit 214 is a so-called touch screen and functions as an operation unit as well. The LAN I/F 216 is connected to the LAN 104 (see FIG. 9). The printing unit 218 is provided with a printing mechanism of an inkjet scheme, a laser scheme, or the like.

The controller 230 is provided with a CPU 232 and a memory 234. The CPU 232 is configured to execute various processes according to a program 240 stored in the memory 234. The memory 234 further stores a UID "u01" of the printing device 200, a user table TB11, and a provisional registration table TB12. The UID is information for identifying a user who uses the printing device 200 (e.g., an account name) In a variant, the UID may be information for identifying the printing device 200 (e.g., serial number).

The user table TB11 is a table for registering user information and an e-mail address in association with each other. The user information includes a user ID and a PIN code as an example of a password. For example, in an example of FIG. 10, a user ID "user_a", a PIN code "1111", and an e-mail address "user1@xxx.co.jp" are registered in association with each other. Further, no e-mail address is registered in association with a user ID "user_c" or a PIN code "3333".

The provisional registration table TB12 is a table for registering a user ID, a print Uniform Resource locator (URL), print data, a candidate flag, and a candidate e-mail address in association with each other. The print data is data generated by image data attached to an e-mail being converted by the APP server 300. The print data has a data format which the printing device 200 can interpret. The print URL is a URL indicating a location of the print data in the APP server 300. The candidate e-mail address is an e-mail address being a candidate to be registered to the user table TB11. The candidate flag is a flag indicating whether the candidate e-mail address is to be registered in the user table TB11 or not. The candidate flag indicates one of a value "YES" meaning that the candidate e-mail address is to be registered and a value "NO" meaning that the candidate e-mail address is not to be registered. In a case where the candidate flag indicates "NO", the candidate e-mail address is not stored in the provisional registration table TB12.

For example, in the example of FIG. 10, the candidate flag "NO" is stored in association with the user ID "user_a" in the provisional registration table TB2. This is because the e-mail address "user1@xxx.co.jp" is already registered in the user table TB11 in association with the user ID "user_a". On the other hand, the candidate flag "YES" and a candidate e-mail address "user3@xxx.co.jp" are stored in the provisional registration table TB12 in association with the user ID "user_c". This is because the e-mail address is not registered yet in the user table TB11 in association with the user ID "user_c".

Figure 11:
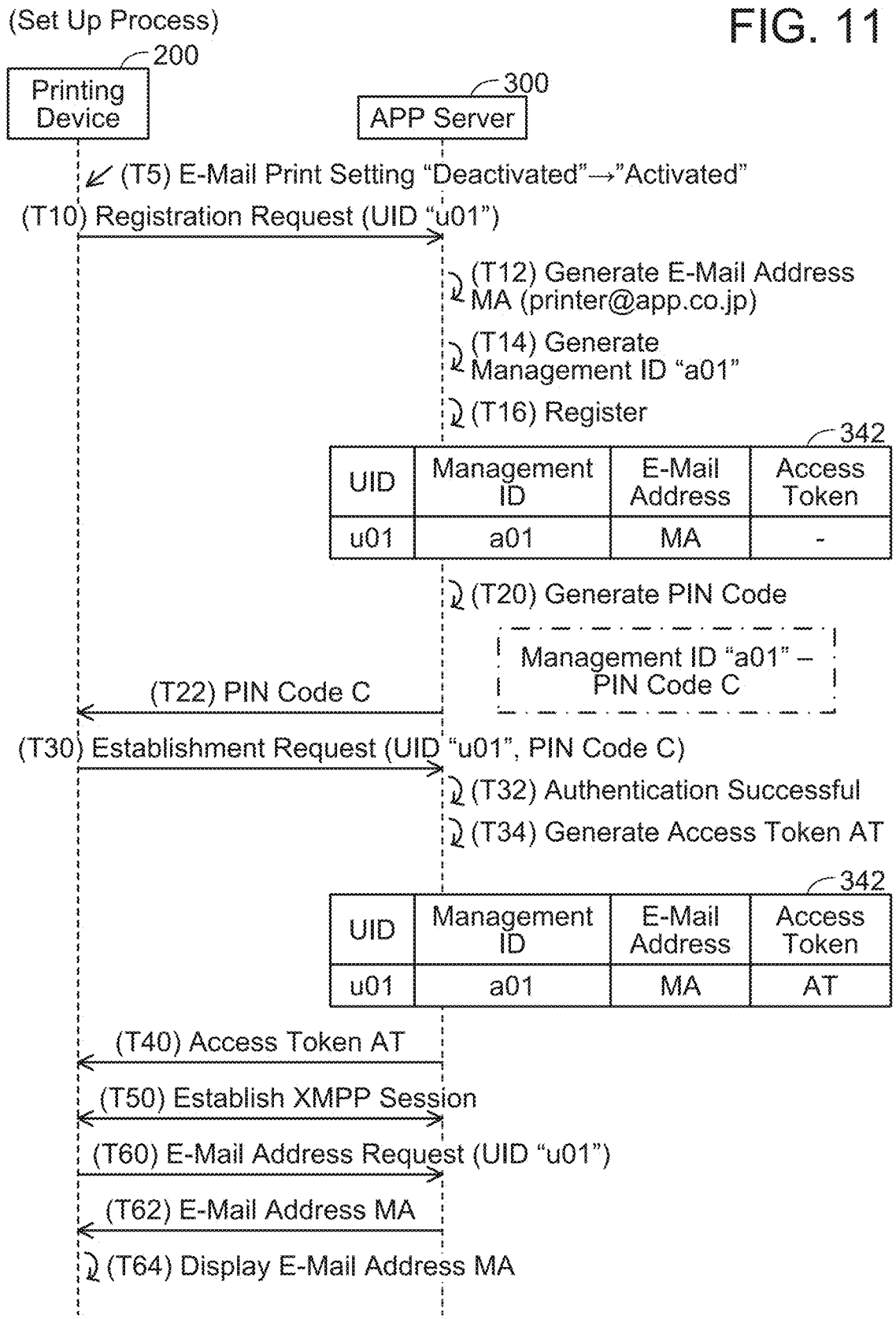
FIG. 11 shows a sequence diagram of a setup process.

Setup Process; FIG. 11

A setup process for registering in the APP server 300 information used in e-mail print communication will be described with reference to FIG. 11. In the description of FIG. 11, for facilitation of understanding, processes executed by respective CPUs of the devices (e.g., the CPU 332 of the APP server 300) may be described with each of the devices (e.g., the APP server 300) as a subject of action instead of describing the processes with each of the respective CPUs as the subject of action. This will apply similarly to FIGS. 14 to 17 and 19 to 23 to be described later. Further, communication between the printing device 200 and the APP server 300 is executed via the LAN 104 and the Internet 108. Hereinbelow, unless otherwise particularly mentioned, the phrases "via the LAN 104" and "via the Internet 108" will be omitted.

In T5, the printing device 200 accepts an operation for changing an e-mail print setting from "deactivated" to "activated" from the user. The e-mail print setting indicates a setting on whether or not to allow execution of the e-mail print. "Deactivated" indicates that the execution of the e-mail print is prohibited, and "activated" indicates that the execution of the e-mail print is permitted. The e-mail print setting indicates "deactivated" by default.

When accepting the operation of T5, the printing device 200 sends to the APP server 300 in T10 a registration request requesting registration of information used for the e-mail print communication. The registration request includes the UID "u01".

When receiving the registration request from the printing device 200 in T10, the APP server 300 generates an e-mail address MA in T12 and generates a management ID "a01" in T14. The e-mail address MA includes a local part "printer" and a domain name "app.co.jp" of the APP server 300. In T16, the APP server 300 stores (i.e. registers) in the device table 342 the UID "u01" in the registration request of T10, the e-mail address MA generated in T12, and the management ID "a01" generated in T14 in association with each other. At this point, an access token is not stored yet in the device table 342 in association with the UID "u01".

Next, in T20, the APP server 300 generates a PIN code C. The APP server 300 stores the management ID "a01" and the PIN code C in the memory 334 in association with each other. Then, in T22, the APP server 300 sends the PIN code C to the printing device 200.

When receiving the PIN code C from the APP server 300 in T22, the printing device 200 sends to the APP server 300 an establishment request requesting establishment of an XMPP session in T30. The establishment request includes the UID "u01" and the PIN code C.

When receiving the establishment request from the printing device 200 in T30, the APP server 300 executes authentication of the PIN code C in the establishment request in T32. In the present case, since the PIN code C in the establishment request is identical to the PIN code C in the memory 334 of the APP server 300, the PIN code C is authenticated successfully. Then, the APP server 300 executes processes from T34. If the authentication of the PIN code in the establishment request fails, the APP server 300 does not execute the processes from T34.

In T34, the APP server 300 generates an access token AT. The APP server 300 identifies the management ID "a01" stored in association with the PIN code C from the memory 334. Then, the APP server 300 stores the generated access token AT in the device table 342 in association with the identified management ID "a01".

In T40, the APP server 300 sends the access token AT to the printing device 200.

When receiving the access token AT from the APP server 300 in T40, the printing device 200 establishes an XMPP session with the APP server 300 using the access token AT in T50.

When establishment of the XMPP session is completed, the printing device 200 sends to the APP server 300 an e-mail address request requesting an e-mail address in T60. The e-mail address request includes the UID "u01".

When receiving the e-mail address request from the printing device 200 in T60, the APP server 300 sends to the printing device 200 the e-mail address MA stored in association with the UID "u01" in the e-mail address request in T62.

When receiving the e-mail address MA from the APP server 300 in T62, the printing device 200 causes the display unit 214 to display the e-mail address MA in T64. Due to this, the user can acknowledge the e-mail address MA.

Figure 12:
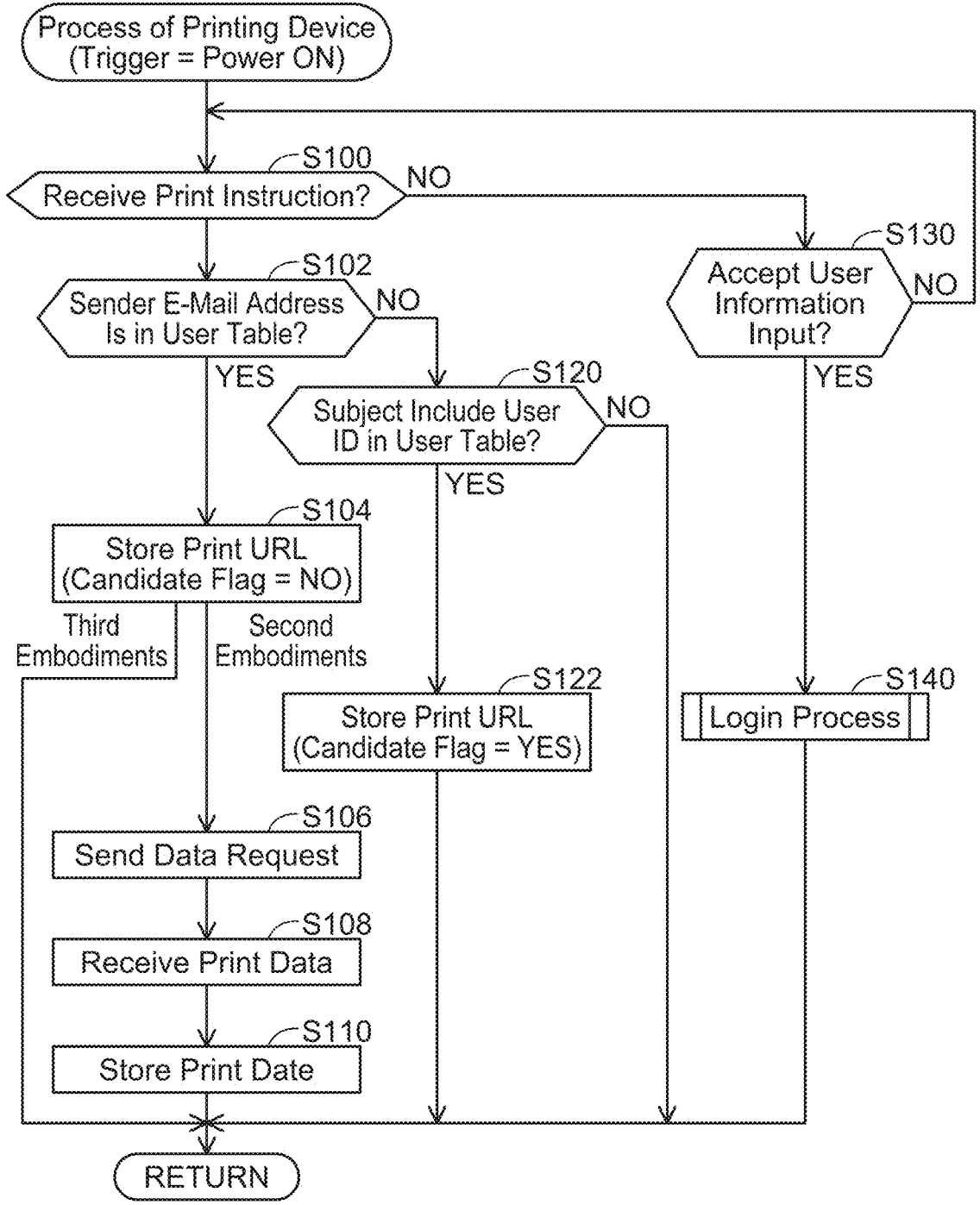
FIG. 12 is a flowchart showing a process by a printing device of second and third embodiments.

Process by Printing Device 200; FIG. 12

Next, a process executed by the CPU 232 of the printing device 200 will be described with reference to FIG. 12. The printing device 200 starts the process of FIG. 12 when its power is turned on.

In S100, the CPU 232 monitors receipt of a print instruction is received from the APP server 300. The print instruction is sent from the APP server 300 to the printing device 200 through the XMPP session (see T50 of FIG. 11) in a case where an e-mail with a recipient e-mail address being MA (see FIG. 11) is received by the APP server 300. This print instruction includes a sender e-mail address of the e-mail, a subject of the e-mail, and a URL indicating a location of print data in the APP server 300. Hereinbelow, the sender e-mail address, the subject, and the URL included in the print instruction will respectively be termed "target e-mail address", "target subject", and "target print URL". The print data identified by the target print URL will be termed "target print data". The CPU 232 determines YES in S100 in a case of receiving the print instruction and proceeds to S102, while it determines NO in S100 in a case of not receiving the print instruction and proceeds to S130.

In S102, the CPU 232 executes a first determination process of determining whether or not the target e-mail address is in the user table TB11. The CPU 232 determines YES in S102 in a case of determining that the target e-mail address is in the user table TB11 and proceeds to S104, while it determines NO in S102 in a case of determining that the target e-mail address is not in the user table TB11 and proceeds to S120. Hereinbelow, a user ID included in user information associated with the target e-mail address in the user table TB11 will be termed "registered user ID".

In S104, the CPU 232 stores the target print URL. Specifically, the CPU 232 stores the registered user ID, the target print URL, and the candidate flag "NO" in association with each other in the provisional registration table TB12.

In S106, the CPU 232 sends a data request to the APP server 300. The data request includes the target print URL stored in S104. The data request is a command requesting the APP server 300 to send the target print data.

In S108, the CPU 232 receives the target print data from the APP server 300. Then, in S110, the CPU 232 stores the target print data in the provisional registration table TB12 in association with the registered user ID. When the process of S110 is completed, the process of FIG. 12 is terminated.

In S120, the CPU 232 executes a second determination process of determining whether or not the target subject includes any of user IDs registered in the user table TB11. The CPU 232 determines YES in S120 in a case of determining that the target subject includes one of the user IDs and proceeds to S122, while it determines NO in S120 in a case of determining that the target subject does not include any of the user IDs and terminates the process of FIG. 12. Hereinbelow, the user ID included in the target subject and also registered in the user table TB11 will be termed "specific user ID".

In S122, the CPU 232 stores the target print URL. Specifically, the CPU 232 stores in the provisional registration table TB12 the specific user ID, the target print URL, the candidate flag "YES", and the target e-mail address in association with each other. When the process of S122 is completed, the process of FIG. 12 is terminated.

In S130, the CPU 232 monitors acceptance of an input of user information is accepted from the user via the operation unit 212. The CPU 232 determines YES in S130 in a case of accepting an input of user information and proceeds to S140, while it determines NO in S130 in a case of determining that an input of user information is not accepted and returns to the monitoring in S100, S130, or the like. Hereinbelow, the user information inputted in S130 will be termed "inputted user information".

In S140, the CPU 232 executes a login process. The login process is a process of executing authentication of the inputted user information and printing the print data.

Figure 13:
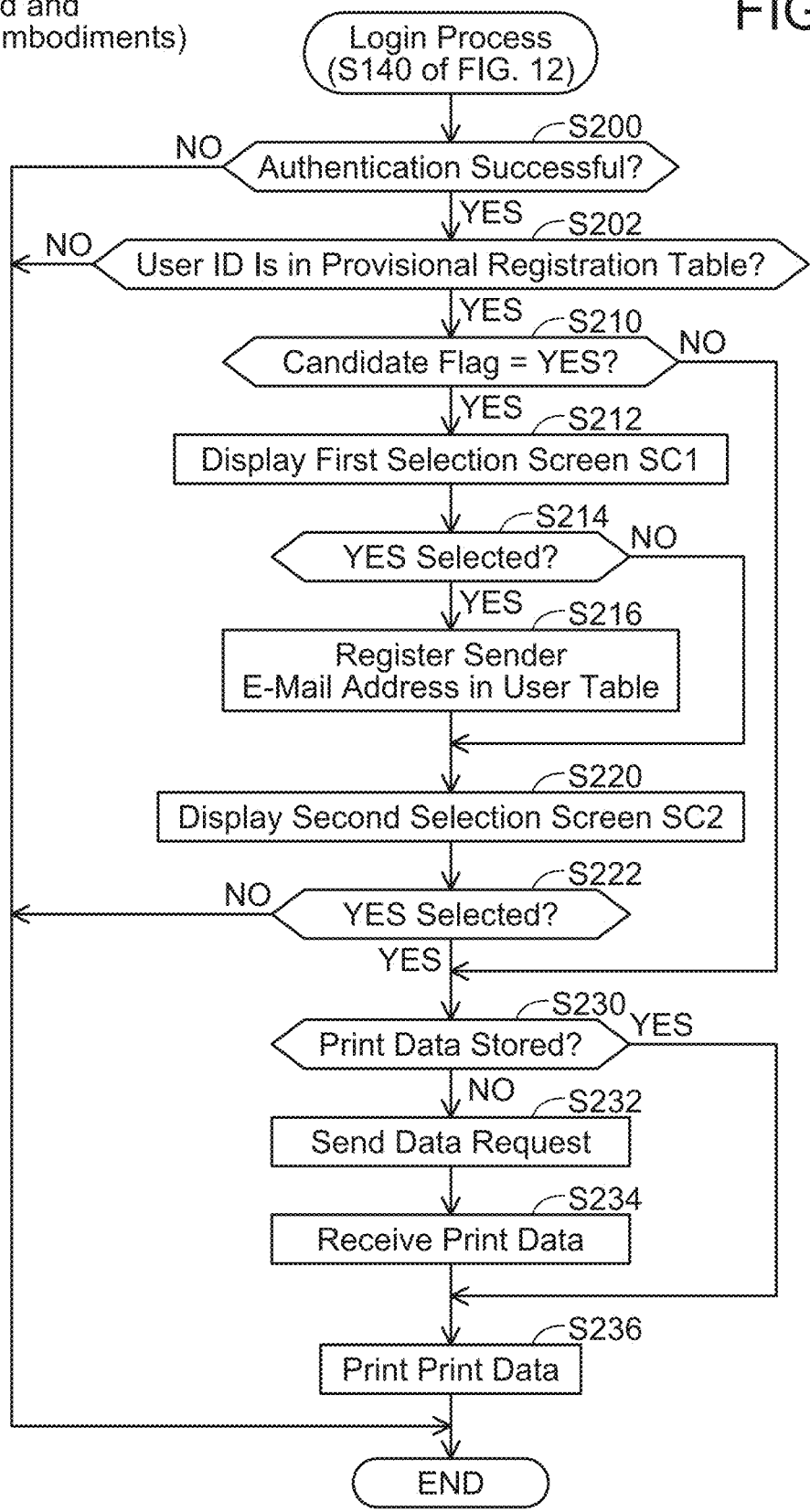
FIG. 13 is a flowchart showing a login process.

Login Process; FIG. 13

Next, the login process in S140 of FIG. 12 will be described with reference to FIG. 13. In S200, the CPU 232 executes authentication of the inputted user information. Specifically, the CPU 232 determines whether or not the inputted user information (i.e., a combination of a user ID and a PIN code) is already registered in the user table TB11. The CPU 232 determines YES in S200 in a case of determining that the inputted user information is already registered in the user table TB11, that is, in a case where the inputted user information is successfully authenticated, and proceeds to S202. On the other hand, in a case of determining that the inputted user information is not registered yet in the user table TB11, that is, in a case where the authentication of the inputted user information fails, the CPU232 terminates the process of FIG. 13 without executing processes from S202.

In S202, the CPU 232 determines whether or not the user ID (hereinbelow termed "authenticated user ID") included in the successfully authenticated user information (i.e., the inputted user information) is in the provisional registration table TB12. The CPU 232 determines YES in S202 in a case of determining that the authenticated user ID is in the provisional registration table TB12 and proceeds to S210, while it determines NO in S202 in a case of determining that the authenticated user ID is not in the provisional registration table TB12 and terminates the process of FIG. 13 without executing processes from S210.

In S210, the CPU 232 determines whether the candidate flag associated with the authenticated user ID in the provisional registration table TB12 indicates YES or NO. The CPU 232 determines YES in S210 in a case where the candidate flag indicates YES and proceeds to S212, while it determines NO in S210 in a case where the candidate flag indicates NO and proceeds to S230.

In S212, the CPU 232 displays a first selection screen SC1 on the display unit 214. The first selection screen SC1 includes a message inquiring of the user whether to register the candidate e-mail address associated with the authenticated user ID in the user table TB11, the candidate e-mail address, a YES button, and a NO button (see FIG. 16). Specifically, the CPU 232 firstly identifies the candidate e-mail address associated with the authenticated user ID from the provisional registration table TB12. Then, the CPU 232 generates the first selection screen SC1 including the identified candidate e-mail address and displays this screen on the display unit 214.

In S214, the CPU 232 determines whether the YES button is selected or the NO button is selected in the first selection screen SC1. The CPU 232 determines YES in S214 in a case where the YES button is selected and proceeds to S216, while it determines NO in S214 in a case where the NO button is selected and proceeds to S220 by skipping the process of S216.

In S216, the CPU 232 registers the candidate e-mail address in the user table TB11. Specifically, the CPU 232 identifies the authenticated user ID from the user table TB11. Then, the CPU 232 registers the candidate e-mail address in association with the identified authenticated user ID in the user table TB11.

In S220, the CPU 232 displays a second selection screen SC2 on the display unit 214. The second selection screen SC2 includes a message inquiring of the user whether to print an image represented by the image data, a YES button, and a NO button.

In S222, the CPU 232 determines whether the YES button is selected or the NO button is selected in the second selection screen SC2. The CPU 232 determines YES in S222 in a case where the YES button is selected and proceeds to S230, while it determines NO in S222 in a case where the NO button is selected and terminates the process of FIG. 13 without executing processes from S230.

In S230, the CPU 232 determines whether or not the target print data is already stored. Specifically, the CPU 232 determines whether or not the target print data is already stored in association with the authenticated user ID in the provisional registration table TB12. The CPU 232 determines YES in S230 in a case where the target print data is already stored, skips processes of S232 and S234, and proceeds to S236. On the other hand, the CPU 232 determines NO in S230 in a case where the target print data is not stored yet and proceeds to S232. The processes of S232 and S234 are similar to the processes of S106 and S108 of FIG. 12.

In S236, the CPU 232 causes the printing unit 218 to print the image represented by the target print data (i.e., the image represented by the image data attached to the e-mail). In the case of determining YES in S230, the CPU 232 identifies the target print data (see S110 of FIG. 12) stored in association with the authenticated user ID from the provisional registration table TB12. Then, the CPU 232 causes the printing unit 218 to print the image represented by the target print data by supplying the identified target print data to the printing unit 218. In the case of determining NO in S230, the CPU 232 causes the printing unit 218 to print the image represented by the target print data by supplying the target print data received in S234 to the printing unit 218. When the process of S236 is completed, the process of FIG. 13 is terminated.

Figure 14:
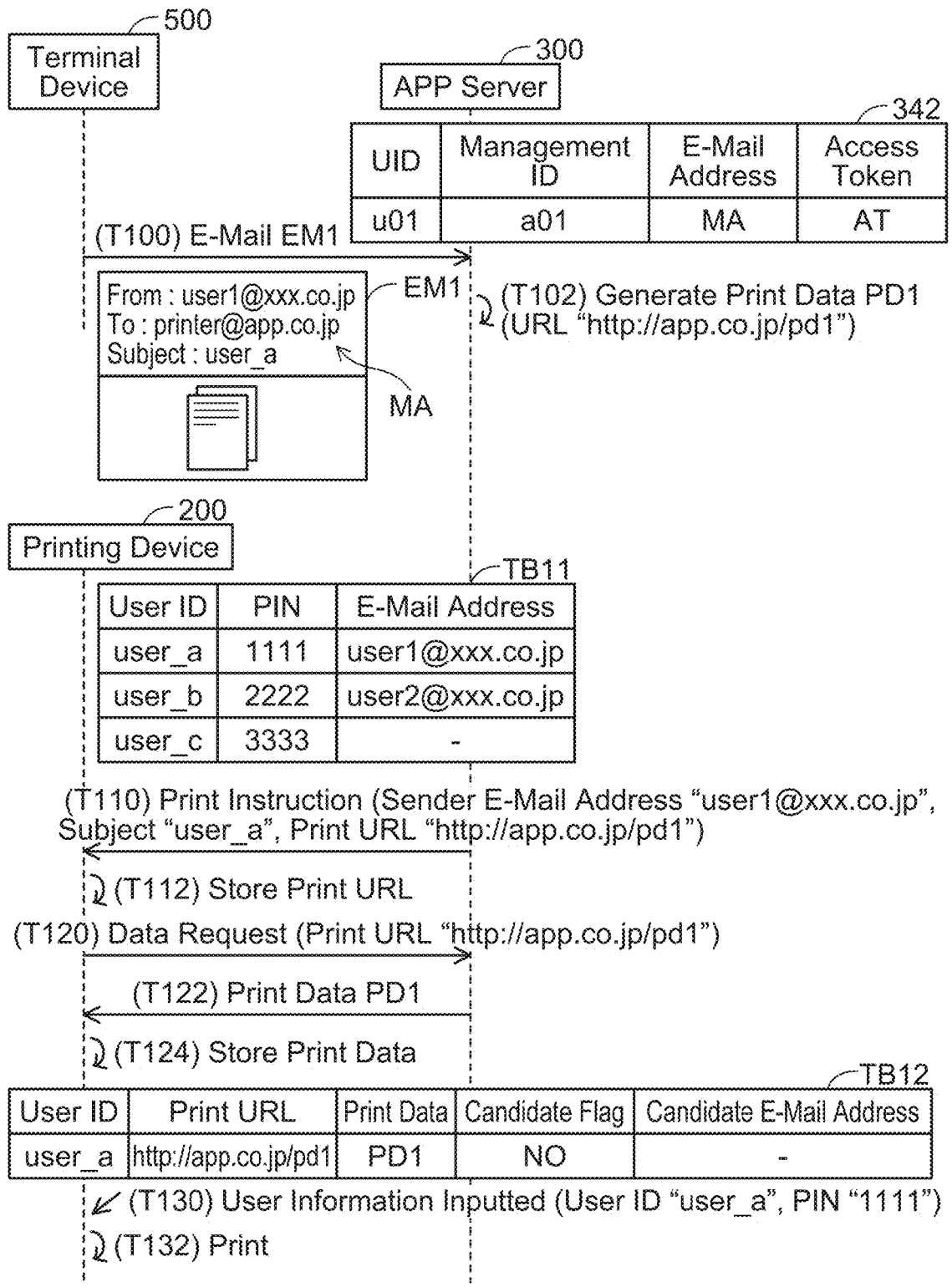
FIG. 14 shows a sequence diagram of Case A of the second embodiment.

Case A; FIG. 14

Next, specific Cases A and B realized by the processes of FIGS. 12 and 13 will be described. Firstly, Case A in which the sender e-mail address is already registered in the user table TB11 will be described with reference to FIG. 14.

In T100 of FIG. 14, the terminal device 500 sends to the APP server 300 an e-mail EM1 including the e-mail address MA as its recipient e-mail address. The e-mail EM1 includes the sender e-mail address "user1@xxx.co.jp", the subject "user_a", and image data.

When receiving the e-mail EM1 from the terminal device 500 in T100, the APP server 300 converts the image data included in the e-mail EM1 to generate print data PD1 in T102. The print data is stored at a location in the APP server 300 indicated by print URL "http://app.co.jp/pd1".

In T110, the APP server 300 identifies the UID "u01" associated with the recipient e-mail address MA included in the e-mail EM1 from the device table 342, and sends the print instruction to the printing device 200 corresponding to the identified UID using the established MPP session (see T50 of FIG. 11). The print instruction includes the sender e-mail address "user1@xxx.co.jp" of the e-mail EM1, the subject "user_a", and the print URL "http://app.co.jp/pd1".

When receiving the print instruction from the APP server 300 in T110 (YES in S100 of FIG. 12), the printing device 200 determines that the e-mail address "user1@xxx.co.jp" is in the user table TB11 (YES in S102), and stores the print URL "http://app.co.jp/pd1" in the provisional registration table TB12 in T112 (S104). Specifically, the printing device 200 firstly identifies the user ID "user_a" associated with the e-mail address "user1@xxx.co.jp" from the user table TB11, and stores in the provisional registration table TB12 the identified user ID, the print URL "http://app.co.jp/pd1", and the candidate flag "NO" in association with each other. Then, the printing device 200 sends the data request including the print URL "http://app.co.jp/pd1" to the APP server 300 in T120 (S106).

When receiving the data request from the printing device 200 in T120, the APP server 300 obtains the print data PD1 stored at the location indicated by the print URL "http://app.co.jp/pd1" included in the data request, and sends the obtained print data to the printing device 200 in T122.

When receiving the print data PD1 from the APP server 300 in T122 (S108), the printing device 200 stores the received print data PD1 in association with the identified user ID identified in T112 in the provisional registration table TB12 in T124 (S110). As above, the printing device 200 stores the print data PD1 before the user authentication is executed. Due to this, the printing device 200 can promptly print the image represented by the print data PD1 upon when the user authentication is executed, as compared to a configuration in which the print data is received from the APP server 300 after the user authentication is executed.

After this, in T130, the printing device 200 accepts an input of the user information including the user ID "user_a" and the PIN code "1111" from the user via the operation unit 212 (YES in S130). In this case, the printing device 200 determines that the user information was successfully authenticated (YES in S200 of FIG. 13) and determines that the print data PD1 is already stored (YES in S202, NO in S210, YES in S230). As such, in T132, the printing device 200 prints the image represented by the print data PD1.

Figure 15:
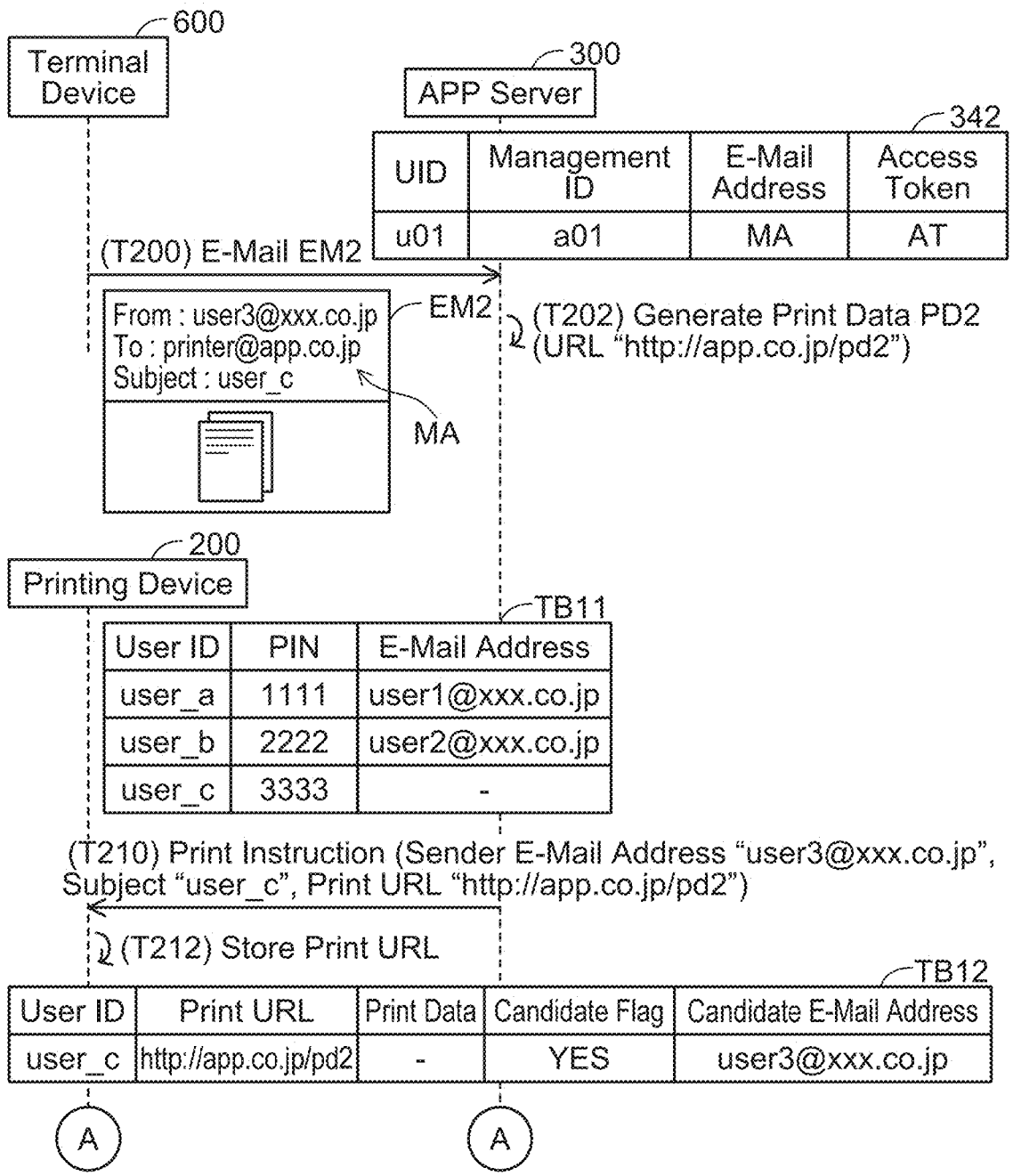
FIG. 15 shows a sequence diagram of Case B of the second embodiment.
Figure 16:
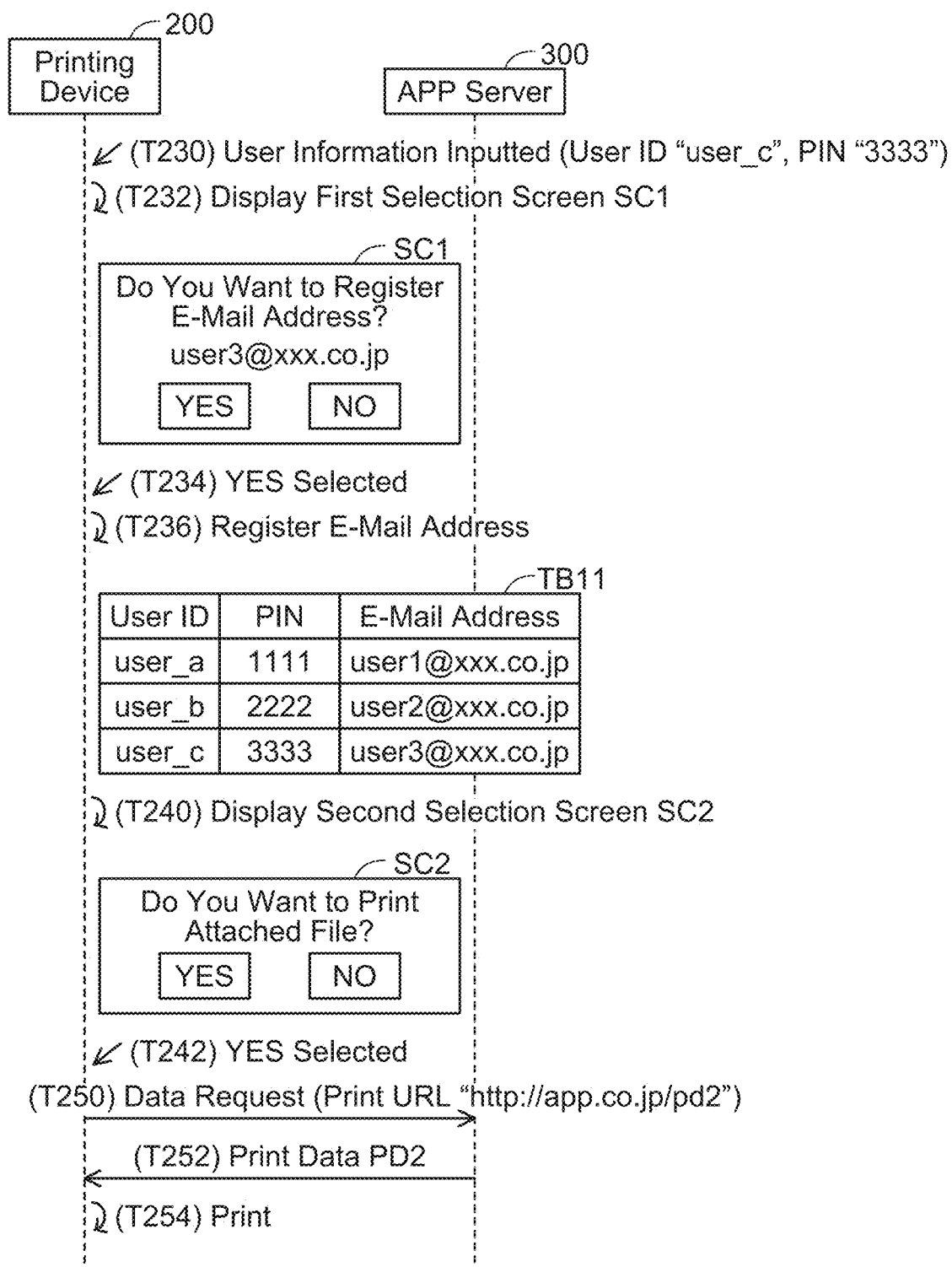
FIG. 16 shows a sequence diagram continued from FIG. 15.

Case B; FIGS. 15 and 16

Next, Case B in which the sender e-mail address is not registered yet in the user table TB11 will be described with reference to FIGS. 15 and 16.

In T200, the terminal device 600 sends an e-mail EM2 including the e-mail address MA as its recipient e-mail address to the APP server 300. The e-mail EM2 includes the sender e-mail address "user3@xxx.co.jp", the subject "user_c", and image data. A process of T202 is similar to the process of T102 of FIG. 14 except that the print data and the print URL are different. A process of T210 is similar to the process of T110 except that the sender e-mail address, the subject, and the print URL included in the print instruction are different.

When receiving the print instruction from the APP server 300 in T210 (YES in S100 of FIG. 12), the printing device 200 determines that the e-mail address "user3@xxx.co.jp" is not in the user table TB11 (NO in S102), determines that the subject "user_c" includes the user ID "user_c" in the user table TB11 (YES in S120), and stores the user ID "user_c", the print URL "http://app.co.jp/pd2", and the candidate flag "YES" in the provisional registration table TB12 in T212 (S122). As above, even in the case where the target e-mail address is not in the user table TB11, the printing device 200 stores the target print URL in the provisional registration table TB12 when the target subject includes one of the user IDs in the user table TB11. Accordingly, the printing device 200 can print the image.

Continuation of FIG. 15; FIG. 16

Then, in T230 of FIG. 16, the printing device 200 accepts an input of the user information including the user ID "user_c" and the PIN code "3333" from the user via the operation unit 212 (YES in S130). In the present case, the printing device 200 determines that the user information was successfully authenticated (YES in S200 of FIG. 13), determines that the user ID "user_c" is in the provisional registration table TB12 (YES in S202), and determines that the candidate flag "YES" is stored in association with this user ID (YES in S210). In this case, the printing device 200 displays the first selection screen SC1 in T232 (S212).

When accepting the selection of the YES button by the user in T234 (YES in S214), the printing device 200 registers the candidate e-mail address "user3@xxx.co.jp" in the user table TB11 in association with the user ID "user_c" in T236 (S216). As above, by displaying the first selection screen SC1, the printing device 200 can allow the user to select whether to register the candidate e-mail address in the user table TB11. Further, in the case where the YES button is selected, the printing device 200 can register the candidate e-mail address in the user table TB11. The user can easily register the e-mail address in the user table TB11 without inputting the e-mail address to the operation unit 212.

Then, in T240, the printing device 200 displays the second selection screen SC2 (S220) and accepts the selection of the YES button by the user in T242 (YES to S222). In this case, the printing device 200 determines that the print data is not stored yet in association with the user ID "user_c" in the provisional registration table TB12 (NO in S230) and sends the data request to the APP server 300 in T250. Processes of T250 and T252 are similar to the processes of T120 and T122 of FIG. 14 except that the print URL and the print data are different. A process of T254 is similar to the process of T132. As above, by displaying the second selection screen SC2, the printing device 200 can allow the user to select whether to print the image represented by the target print data. Further, in the case where the YES button is selected, the printing device 200 can print the image.

Effects of Present Embodiment

According to the above configuration, when receiving the print instruction including the sender address "user1@xxx.co.jp" of the e-mail EM1 including the image data and the print URL "http://app.co.jp/pd1" from the APP server 300 (S100 of FIG. 12, T110 of FIG. 14), the printing device 200 determines whether or not this sender e-mail address is in the user table TB11 (S102). Then, in the case where it is determined that the sender e-mail address is in the table (YES in S102) and the authentication of the inputted user information is successful (YES in S200 of FIG. 13), the printing device 200 prints the target image (S236, T132). Thus, security can be enhanced in a situation where the target image represented by the image data included in the e-mail is to be printed.

Corresponding Relationships

The printing device 200 and the APP server 300 are respectively examples of "printing device" and "server". The LAN I/F 216 and the operation unit 212 are respectively examples of "communication interface" and "input unit". The print URL "http://app.co.jp/pd1" (and "http://app.co.jp/pd2") is examples of "first (and second) relation information" and "location information". The print data PD1 (and PD2) is an example of "image data". The user table TB11 is an example of "table". The combination of the user ID "user_a" and the PIN code "1111" is an example of "registered user information". The user ID "user_c" and the combination of the user ID "user_c" and the PIN code "3333" are respectively examples of "specific user ID" and "specific user information". The first selection screen SC1 and the second selection screen SC2 are respectively examples of "first selection screen" and "second selection screen".

Corresponding relationships between the respective processes in the above embodiment and the respective processes executed by "controller" of "printing device" will be described. The process of S100 and the process of S102 of FIG. 12 are respectively examples of "receive a print instruction" and "determine whether the sender e-mail address included in the print instruction is in a table". The process of S106 and the process of S232 are examples of "send a data request". The process of S108 and the process of S234 are examples of "receive the image data". The process of S110 is an example of "store the image data". The process of S120 and the process of S122 are respectively examples of "determine whether the subject includes a user ID registered in the table" and "store the sender e-mail address (and "store second relation information")". The process of S200, the process of S212, and the process of S220 of FIG. 13 are respectively examples of "determine whether the inputted user information is identical to the registered user information in the table", "display a first selection screen", and "display a second selection screen". The process of S236 is an example of "in a case where it is determined that the sender e-mail address is in the table and inputted user information which is inputted to the input unit is identical to registered user information which is registered in the table in association with the sender e-mail address, cause the printing unit to print the target image (and "in a case where it is determined that the subject includes a specific user ID registered in the table, cause the printing unit to print the target image")".

Third Embodiment

A third embodiment is similar to the second embodiment except that the processes of S106 to S110 of FIG. 12 are not executed. That is, when completing the storage of the target print URL in S104, the printing device 200 terminates the process of FIG. 12 without executing the processes of S106 to S110.

Figure 17:
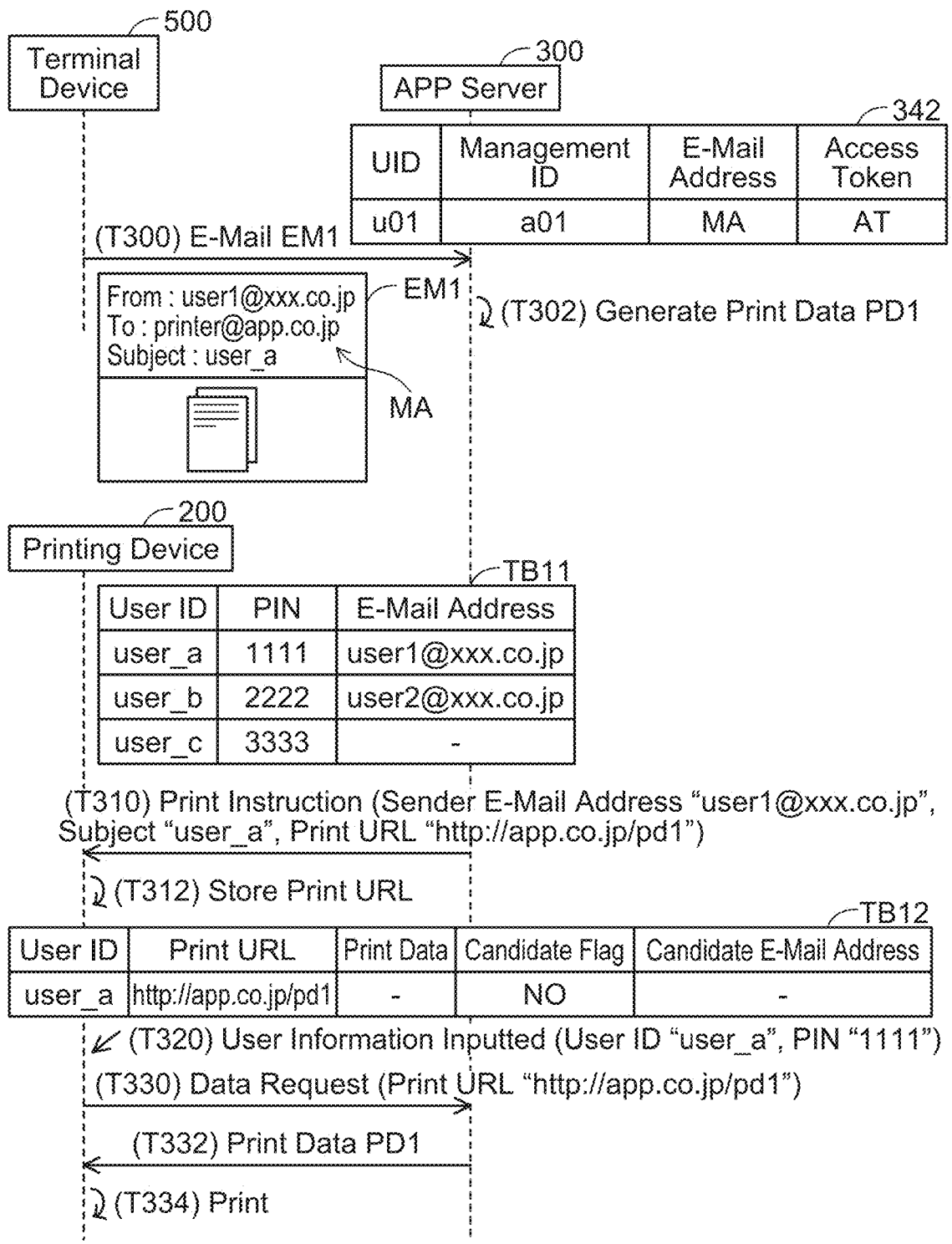
FIG. 17 shows a sequence diagram of Case C of the third embodiment.

Case C; FIG. 17

Next, Case C realized by the present embodiment will be described with reference to FIG. 17. Processes of T300 to T312 of FIG. 17 are similar to the processes of T100 to T112 of FIG. 14. A process of T320 is similar to the process of T130.

In the present case, the printing device 200 determines that the authentication of the user information was successful (YES in S200 of FIG. 13), and determines that the print data is not stored yet in association with the user ID "user_a" (YES in S202, NO in S210, NO in S230). As such, the printing device 200 sends the data request to the APP server 300 in T330 (S232) and receives the print data PD1 from the APP server 300 in T332 (S234). Processes of T330 and T332 are similar to the processes of T120 and T122 of FIG. 14. Then, in T334, the printing device 200 prints the image represented by the print data PD1 (S236).

Effects of Present Embodiment

As above, in the case where the user information is authenticated successfully (YES to S200 of FIG. 13), the printing device 200 sends the data request to the APP server 300 (S232) and receives the print data PD1 from the APP server 300 (S234) and prints the image represented by the print data PD1 (S236). Since the printing device 200 executes the printing immediately after having received the print data PD1 from the APP server 300, the print data PD1 does not need to be stored over a long period of time. Due to this, a memory capacity for storing the print data can be small. Further, the communication of the print data PD1 is not executed between the printing device 200 and the APP server 300 before the user information is successfully authenticated. This can reduce an increase in a communication load on a network to which the printing device 200 belongs.

Fourth Embodiment

In this embodiment, the first and second determination processes are executed by the APP server 300 not by the printing device 200 but by the APP server 300.

Configuration of Communication System 102; FIG. 9

As shown in FIG. 9, the communication system 102 further includes a user management server 400. The user management server 400 is connected to the Internet 108, and is configured to communicate with the respective devices 300, 500, 600 via the Internet 108. Further, the user management server 400 is configured to communicate with the printing device 200 via the LAN 104 and the Internet 108.

Configuration of APP Server 300; FIG. 10

The memory 334 of the APP server 300 further stores a provisional registration table TB12. This table TB12 is similar to the provisional registration table TB12 which the printing devices 200 of the second and third embodiments store. The printing device 200 of the present embodiment does not store the provisional registration table TB12.

Configuration of User Management Server 400

The user management server 400 is a server for managing the user information. The user management server 400 is provided with a network I/F 416 and a controller 430. The respective units 416 and 430 are connected to a bus line (reference sign omitted). The network I/F 416 is connected to the Internet 108 (see FIG. 9). The controller 430 is provided with a CPU 432 and a memory 434. The CPU 432 is configured to execute various processes according to a program 440 stored in the memory 434. The memory 434 stores a user table TB11 as well as the program 440 as above. This table TB11 is similar to the user table TB11 which the printing devices 200 of the second and third embodiments store. The printing device 200 of the present embodiment does not store the user table TB11.

Figure 18:
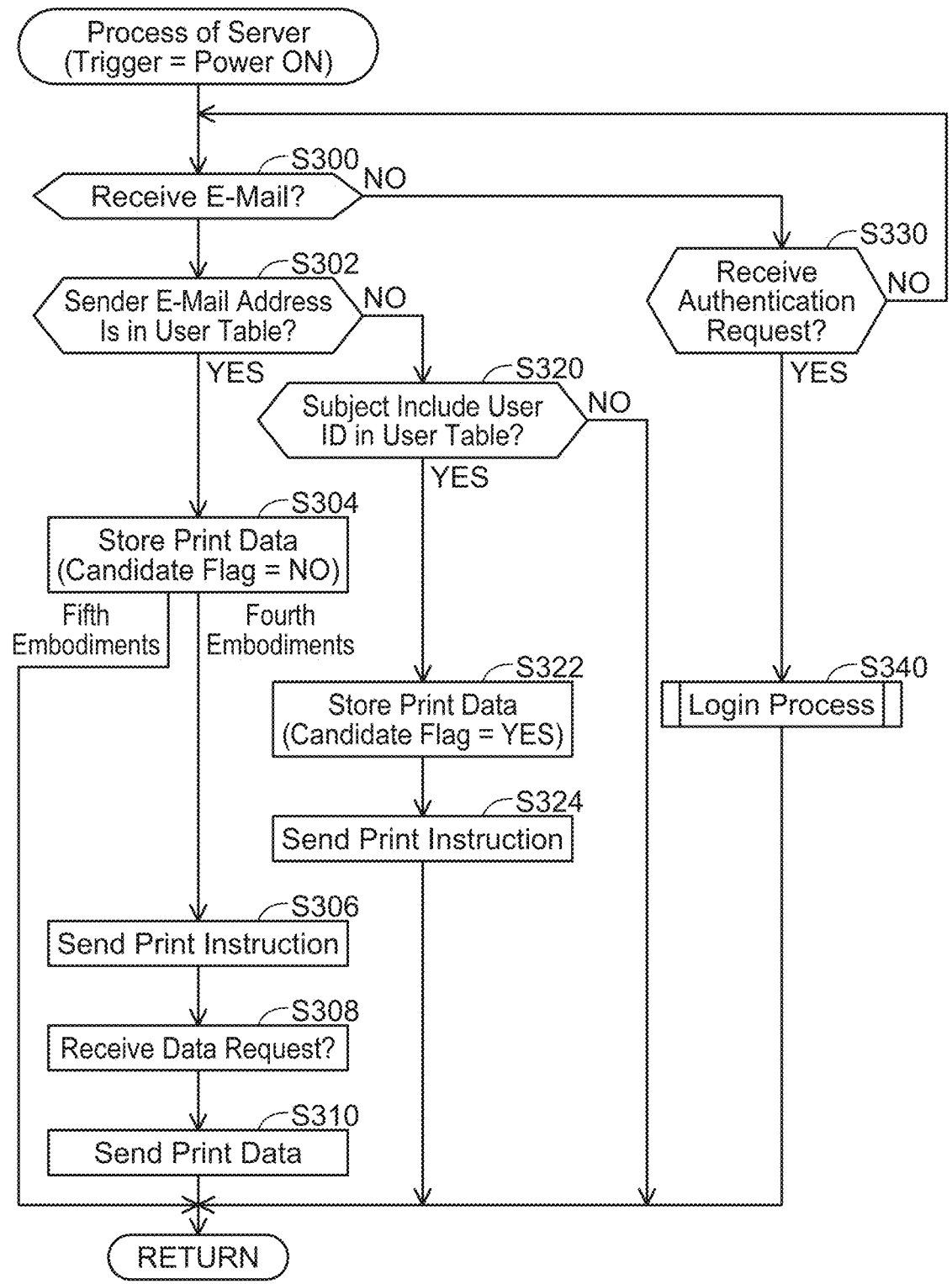
FIG. 18 is a flowchart showing a process by an APP server of fourth and fifth embodiments.

Process by Server; FIG. 18

Next, a process executed by the CPU 332 of the APP server 300 will be described with reference to FIG. 18. The APP server 300 starts the process of FIG. 18 when its power is turned on.

In S300, the CPU 332 monitors receipt of an e-mail from a terminal device (e.g., 500). The e-mail includes the recipient e-mail address, the sender e-mail address (i.e., target e-mail address), the subject (i.e., target subject), and image data (i.e., target image data). In a case of receiving the e-mail, the CPU 332 determines YES in S300 and proceeds to S302, while it determines NO in S300 in a case of not receiving an e-mail and proceeds to S330.

In S302, the CPU 332 executes a first determination process of determining whether or not the target e-mail address is in the user table TB11. Specifically, when receiving the e-mail, the CPU 332 sends an inquiry including the target e-mail address and the target subject to the user management server 400. In this case, the user management server 400 firstly determines whether or not the target e-mail address is in the user table TB11. In a case of determining that the target e-mail address is not in the user table TB11, the user management server 400 determines whether or not the target subject includes any one of user IDs registered in the user table TB11. Then, the user management server 400 sends an inquiry result indicating the result of the determination(s) as above to the APP server 300. In a case of receiving the inquiry result indicating that the target e-mail address is in the user table TB11, the CPU 332 determines YES in S302 and proceeds to S304. In this case, the inquiry result includes the user ID (hereinbelow termed "registered user ID") associated with the target e-mail address in the user table TB11. On the other hand, in a case of receiving the inquiry result indicating that the target e-mail address is not in the user table TB11, the CPU 332 determines NO in S302 and proceeds to S320.

In S304, the CPU 332 stores print data. Specifically, the CPU 332 converts the target image data to generate target print data, and stores in the provisional registration table TB12 the registered user ID included in the aforementioned inquiry result, a target print URL indicating the location of the target print data in the APP server 300, the target print data, and the candidate flag "NO" in association with each other.

In S306, the CPU 332 sends a print instruction to a printing device. Specifically, the CPU 332 identifies the UID associated with the recipient e-mail address included in the e-mail received in S300 from the device table 342, and sends the print instruction to the printing device corresponding to the identified UID. Hereinbelow, the description will proceed by taking an example in which the recipient printing device of the print instruction is the printing device 200. The print instruction includes the registered user ID and the target print URL. As a result, in the printing device 200, the registered user ID and the target print URL are stored in the memory 234 in association with each other.

In S308, the CPU 332 determines whether or not a data request is received from the printing device 200. The data request includes the target print URL included in the print instruction sent in S306. In a case of receiving the data request from the printing device 200, the CPU 332 determines YES in S308 and proceeds to S310, while it determines NO in S308 and terminates the process of FIG. 18 in a case of not receiving a data request from the printing device 200.

In S310, the CPU 332 sends to the printing device 200 the target print data stored at the location indicated by the target print URL included in the data request received in S308. As a result, in the printing device 200, the target print data is stored in the memory 234 in association with the registered user ID. When the process of S310 is completed, the process of FIG. 18 is terminated.

In S320, the CPU 332 executes a second determination process of determining whether or not the target subject includes any of the user IDs registered in the user table TB11. The CPU 332 determines YES in S320 and proceeds to S322 in a case where the aforementioned inquiry result indicates that the target subject includes one of the user IDs. In this case, the inquiry result includes the user ID that is included in the target subject and is registered in the user table TB11 (hereinbelow termed "specific user ID"). On the other hand, in a case where the aforementioned inquiry result indicates that the target subject does not include any of the user IDs, the CPU 332 determines NO in S320 and terminates the process of FIG. 18.

In S322, the CPU 332 stores in the provisional registration table TB12 the specific user ID included in the aforementioned inquiry result, the target print URL, the target print data, the candidate flag "YES", and the target e-mail address in association with each other. Then, in S324, the CPU 332 sends a print instruction to the printing device 200. The print instruction includes the specific user ID and the target print URL. As a result, in the printing device 200, the specific user ID and the target print URL are stored in the memory 234 in association with each other. When the process of S324 is completed, the process of FIG. 18 is terminated.

In S330, the CPU 332 monitors receipt of an authentication request from a printing device (e.g., 200). In a case where user information is inputted to the printing device, the APP server 300 receives authentication request including the user information from this printing device (YES in S330) and proceeds to S340, while in a case of not receiving authentication request, the APP server 300 determines NO in S330 and returns to the monitoring of S300, S330, or the like. Hereinbelow, the user information included in the authentication request will be termed "inputted user information". Hereinbelow, the description will proceed by taking an example in which the inputted user information is inputted to the printing device 200.

In S340, the CPU 332 executes a login process. The login process is a process of executing authentication of the inputted user information and sending print data.

Figure 19:
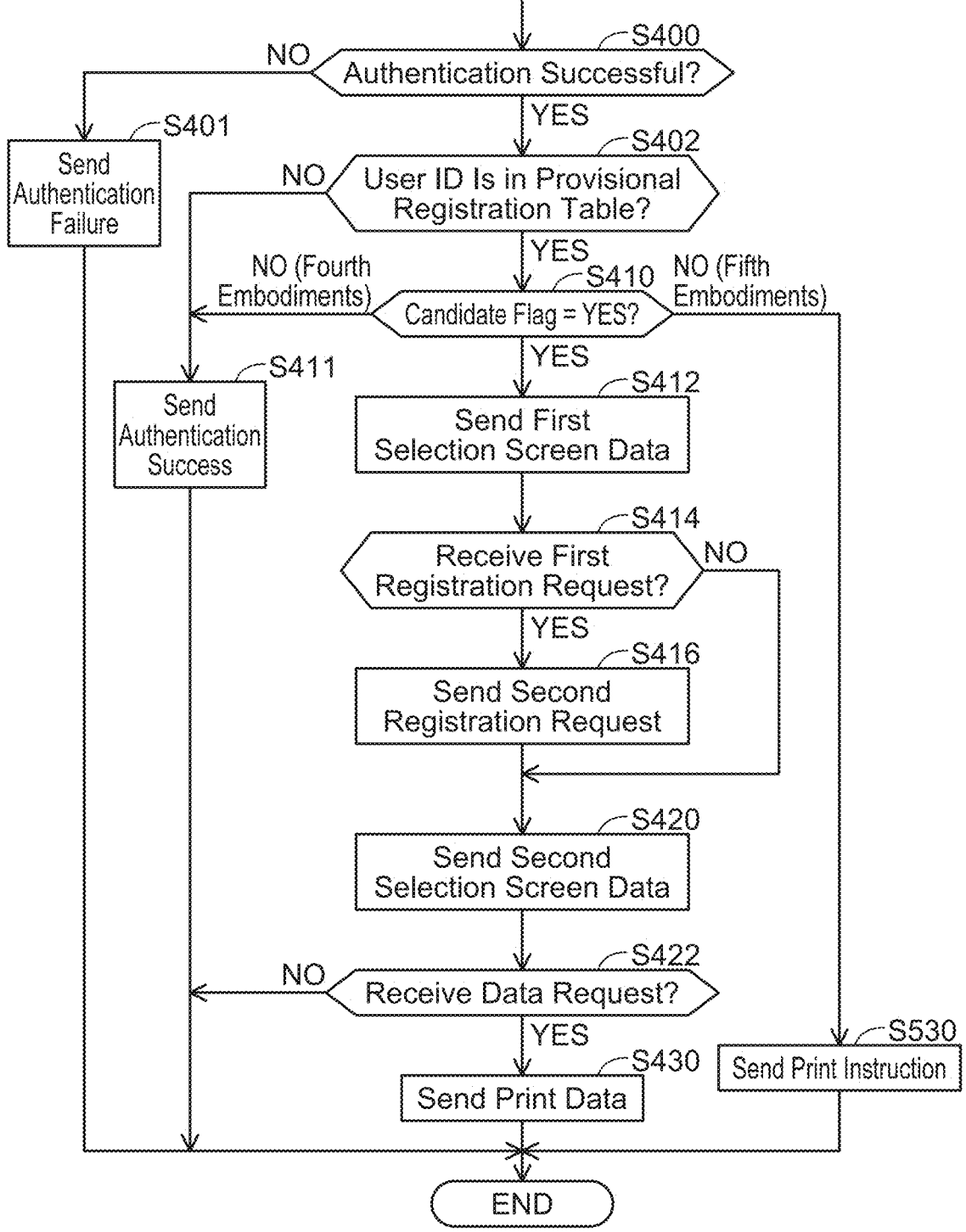
FIG. 19 is a flowchart of a login process.

Login Process; FIG. 19

Next, the login process in S340 of FIG. 18 will be described with reference to FIG. 19. In S400, the CPU 332 executes authentication of the inputted user information. Specifically, the CPU 332 transfers the authentication request received from the printing device 200 to the user management server 400. In this case, the user management server 400 determines whether or not the inputted user information (i.e., the combination of a user ID and a PIN code) is registered in the user table TB11. The user management server 400 sends a response indicating that the authentication was successful to the APP server 300 in a case of determining that the inputted user information is registered in the user table TB11, that is, in a case where the inputted user information is successfully authenticated. This response includes the user ID included in the user information (i.e., inputted user information) of which authentication was successful (hereinbelow denoted "authenticated user ID"). On the other hand, in a case of determining that the inputted user information is not registered in the user table TB11, that is, in a case where the authentication of the inputted user information fails, the user management server 400 sends to the APP server 300 a response indicating that the authentication failed. In a case of receiving the response indicating that the authentication was successful from the user management server 400, the CPU 332 determines YES in S400 and proceeds to S402. On the other hand, in a case of receiving the response indicating that the authentication failed from the user management server 400, the CPU 332 determines NO in S400 and proceeds to S401.

In S401, the CPU 332 sends the response indicating that the authentication failed to the printing device 200. As a result, in the printing device 200, a process such as printing of an image is not executed due to the authentication of the user information inputted to the printing device 200 having failed. When the process of S401 is completed, the process of FIG. 19 is terminated.

In S402, the CPU 332 determines whether or not the authenticated user ID is in the provisional registration table TB12. In a case of determining that the authenticated user ID is in the provisional registration table TB12, the CPU 332 determines YES in S402 and proceeds to S410, while it determines NO in S402 and proceeds to S411 in a case of determining that the authenticated user ID is not in the provisional registration table TB12.

In S410, the CPU 332 determines whether the candidate flag associated with the authenticated user ID in the provisional registration table TB12 indicates YES or NO. In a case where the candidate flag indicates YES, the CPU 332 determines YES in S410 and proceeds to S412, while it determines NO in S410 and proceeds to S411 in a case where the candidate flag indicates NO.

In S411, the CPU 332 sends the response indicating that the authentication was successful to the printing device 200. As a result, the image is printed in the case where the target print data is stored in the printing device 200 (see S310 of FIG. 18). In a case where the target print data is not stored in the printing device 200, the image is not printed. When the process of S411 is completed, the process of FIG. 19 is terminated.

In S412, the CPU 332 sends first selection screen data representing the first selection screen SC1 to the printing device 200. As a result, the first selection screen SC1 is displayed on the display unit 214 of the printing device 200. In S412, the CPU 332 also sends the response indicating that the authentication was successful to the printing device 200 along with the first selection screen data.

In S414, the CPU 332 determines whether or not a first registration request is received from the printing device 200. The first registration request is a command that requests registration of a candidate e-mail address to the user table TB11 and includes the authenticated user ID. The first registration request is sent from the printing device 200 to the APP server 300 in a case where the YES button in the first selection screen SC1 is selected by the user. In a case where the NO button in the first selection screen SC1 is selected by the user, information indicating that the NO button was selected is sent from the printing device 200 to the APP server 300. In a case of receiving the first registration request, the CPU 332 determines YES in S414 and proceeds to S416. On the other hand, in a case of receiving the information indicating that the NO button was selected, the CPU 332 determines NO in S414, skips S416, and proceeds to S420.

In S416, the CPU 332 sends a second registration request to the user management server 400. The second registration request includes the authenticated user ID included in the first registration request and the candidate e-mail address stored in the provisional registration table TB12 in association with the authenticated user ID. As a result, in the user management server 400, this candidate e-mail address is registered in the user table TB11 in association with the authenticated user ID.

In S420, the CPU 332 sends second selection screen data representing the second selection screen SC2 to the printing device 200. As a result, the second selection screen SC2 is displayed on the display unit 214 of the printing device 200.

In S422, the CPU 332 determines whether or not a data request is received from the printing device 200. The data request is sent from the printing device 200 to the APP server 300 in a case where the YES button in the second selection screen SC2 is selected by the user. In a case where the NO button in the second selection screen SC2 is selected by the user, information indicating that the NO button was selected is sent from the printing device 200 to the APP server 300. In a case of receiving the data request, the CPU 332 determines YES in S422 and proceeds to S430. On the other hand, in a case of receiving the information indicating that the NO button was selected, the CPU 332 determines NO in S422 and terminates the process of FIG. 19. A process of S430 is similar to the process of S310 of FIG. 18. As a result, in the printing device 200, the image represented by the target image data is printed in response to the response indicating that the authentication was successful having been received (see S412) and the target print data having been received (S430). When the process of S430 is completed, the process of FIG. 19 is terminated.

Figure 20:
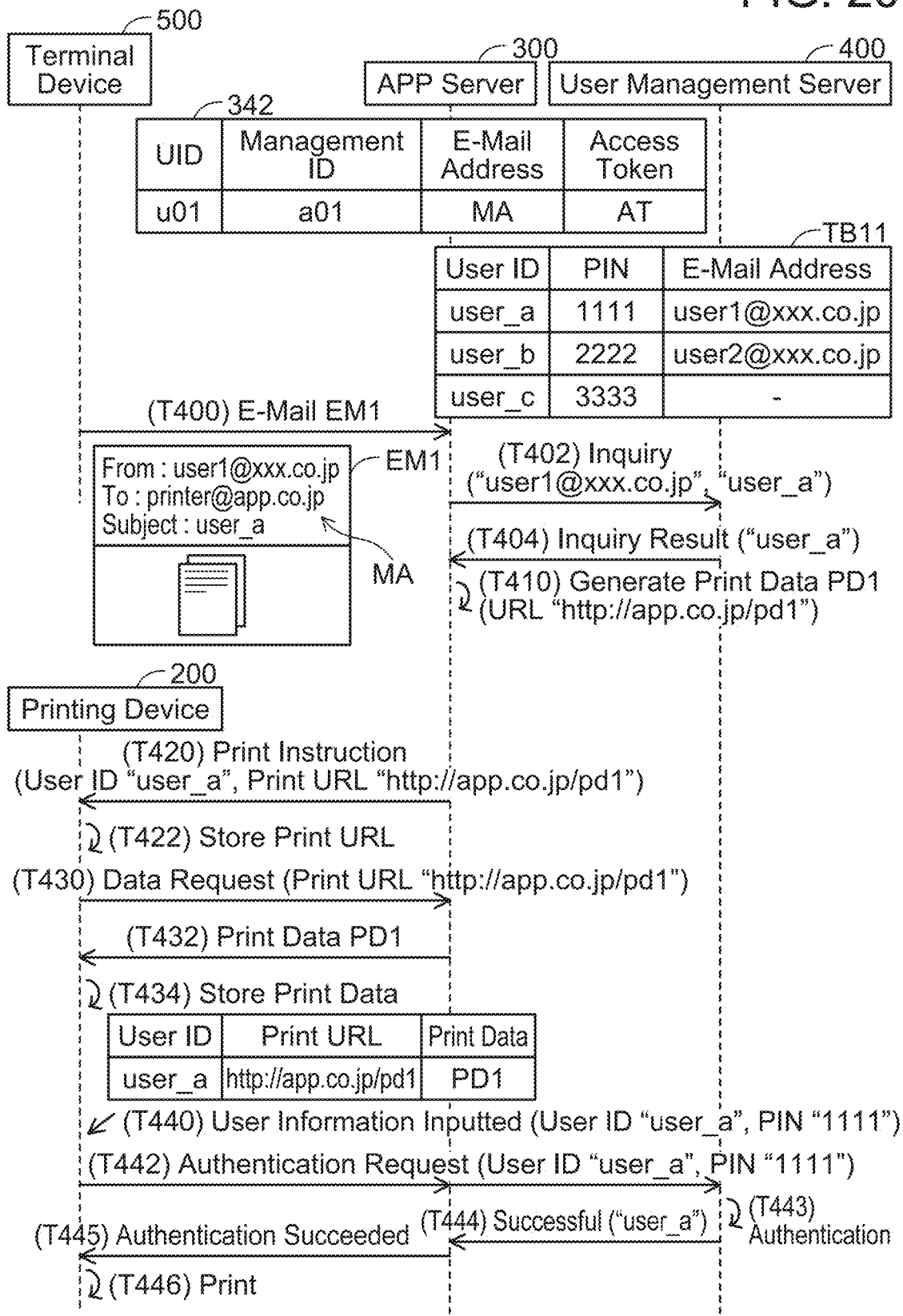
FIG. 20 shows a sequence diagram of Case D of the fourth embodiment.

Case D; FIG. 20

Next, specific Cases D and E realized by the processes of FIGS. 18 and 19 will be described. Firstly, Case D in which a sender e-mail address is already registered in the user table TB11 will be described with reference to FIG. 20.

When receiving an e-mail EM1 from the terminal device 500 in T400, the APP server 300 sends an inquiry including the e-mail address "user1@xxx.co.jp" and the subject "user_a" to the user management server 400 in T402.

When receiving the inquiry from the APP server 300 in T402, the user management server 400 determines that the target e-mail address is in the user table TB11, and sends to the APP server 300 an inquiry result indicating that the target e-mail address is in the user table TB11 in T404. The inquiry result includes the user ID "user_a".

When receiving the inquiry result from the user management server 400 in T404, the APP server 300 determines that the target e-mail address is in the user table TB11 (YES in S302). Then, in T410, the APP server 300 generates print data PD1, and registers in the provisional registration table TB12 the user ID "user_a" included in the inquiry result received in T404, a print URL "http://app.co.jp//pd1", the print data PD1, and the candidate flag "NO" in association with each other (S304).

In T420, the APP server 300 sends a print instruction to the printing device 200 by using the established XMPP session (see T50 of FIG. 11) (S306). The print instruction includes the user ID "user_a" and the print URL "http://app.co.jp/pd1". As above, since the APP server 300 sends the print instruction including the print URL to the printing device 200, the APP server 300 can suitably receive a data request including the print URL from the printing device 200 in processes to be described later, as a result of which the APP server 300 can suitably send the print data to the printing device 200.

When receiving the print instruction from the APP server 300 in T420, the printing device 200 stores in the memory 234 of the printing device 200 the user ID "user_a" included in the print instruction and the print URL "http://app.co.jp/pd1" included in the print instruction in T422. Processes of T430 and T432 are similar to the processes of T120 and T122 of FIG. 14. Then, in T434, the printing device 200 stores the print data PD1 in the memory 234 in association with the user ID "user_a". As above, the printing device 200 stores the print data PD1 before the user authentication is executed. Due to this, the printing device 200 can promptly print the image represented by the print data PD1 upon when the user authentication is executed, as compared to a configuration in which the print data is received from the APP server 300 after the user authentication is executed.

When accepting an input of user information in T440, the printing device 200 sends an authentication request including the inputted user ID "user_a" and PIN code "1111" to the APP server 300 in T442.

When receiving the authentication request from the printing device 200 in T442 (YES in S330), the APP server 300 transfers this authentication request to the user management server 400.

When receiving the authentication request from the APP server 300 in T442, the user management server 400 determines that the authentication of the user information is successful in T443, and sends a response indicating that the authentication was successful to the APP server 300 in T444.

When receiving the response from the user management server 400 in T444, the APP server 300 determines that the user information was successfully authenticated (YES in S400 of FIG. 19). Further, the APP server 300 determines that the user ID "user_a" included in the response is in the provisional registration table TB12 (YES in S402), and the candidate flag "NO" is stored in association with this user ID (NO in S410). As such, the APP server 300 does not send the first and second selection screen data to the printing device 200, but sends to the printing device 200 an authentication response indicating that the authentication was successful in T445 (S411).

When receiving the response indicating that the authentication was successful from the APP server 300 in T445, the printing device 200 prints the image represented by the print data PD1 in T446.

Figure 21:
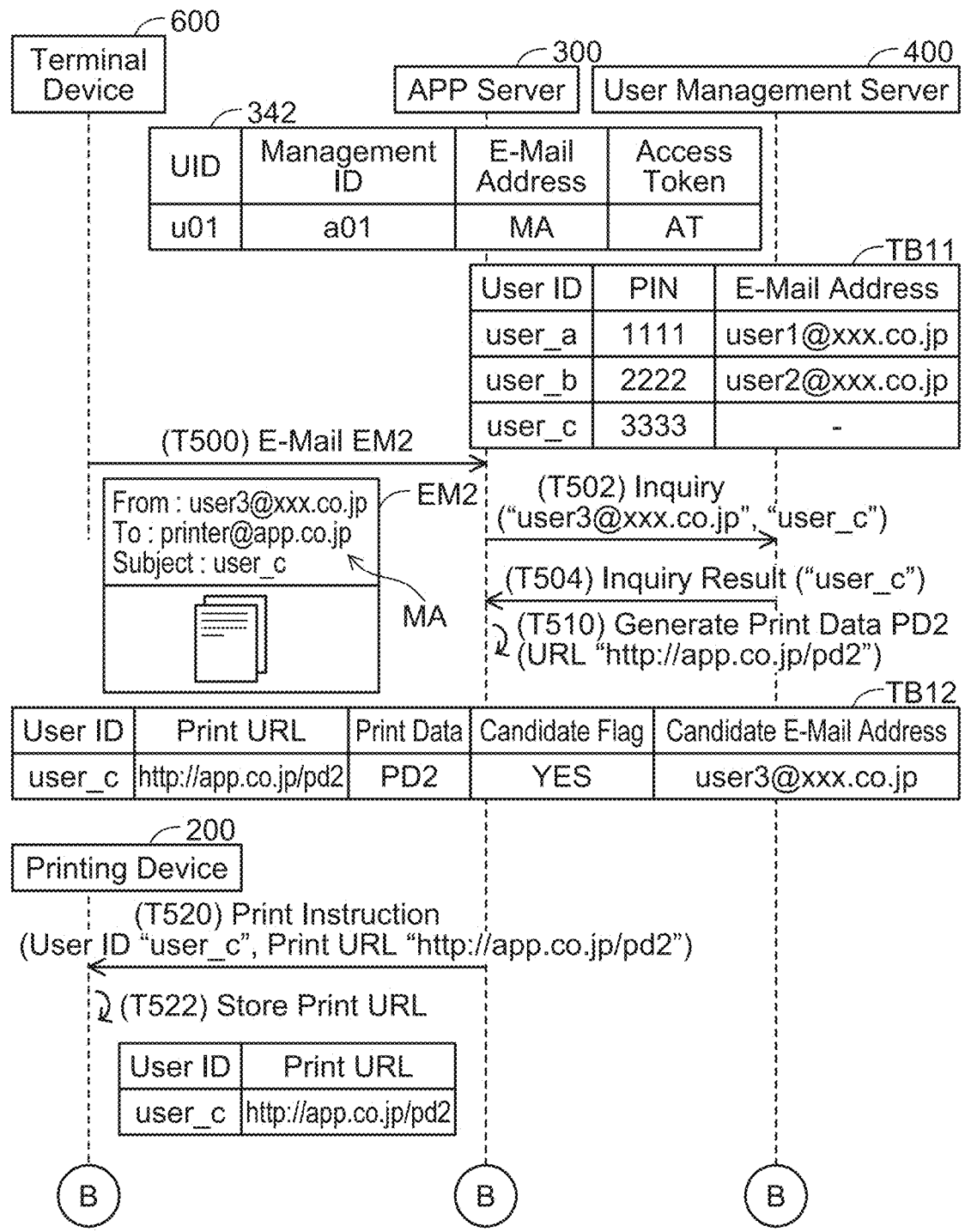
FIG. 21 shows a sequence diagram of Case E of the fourth embodiment.
Figure 22:
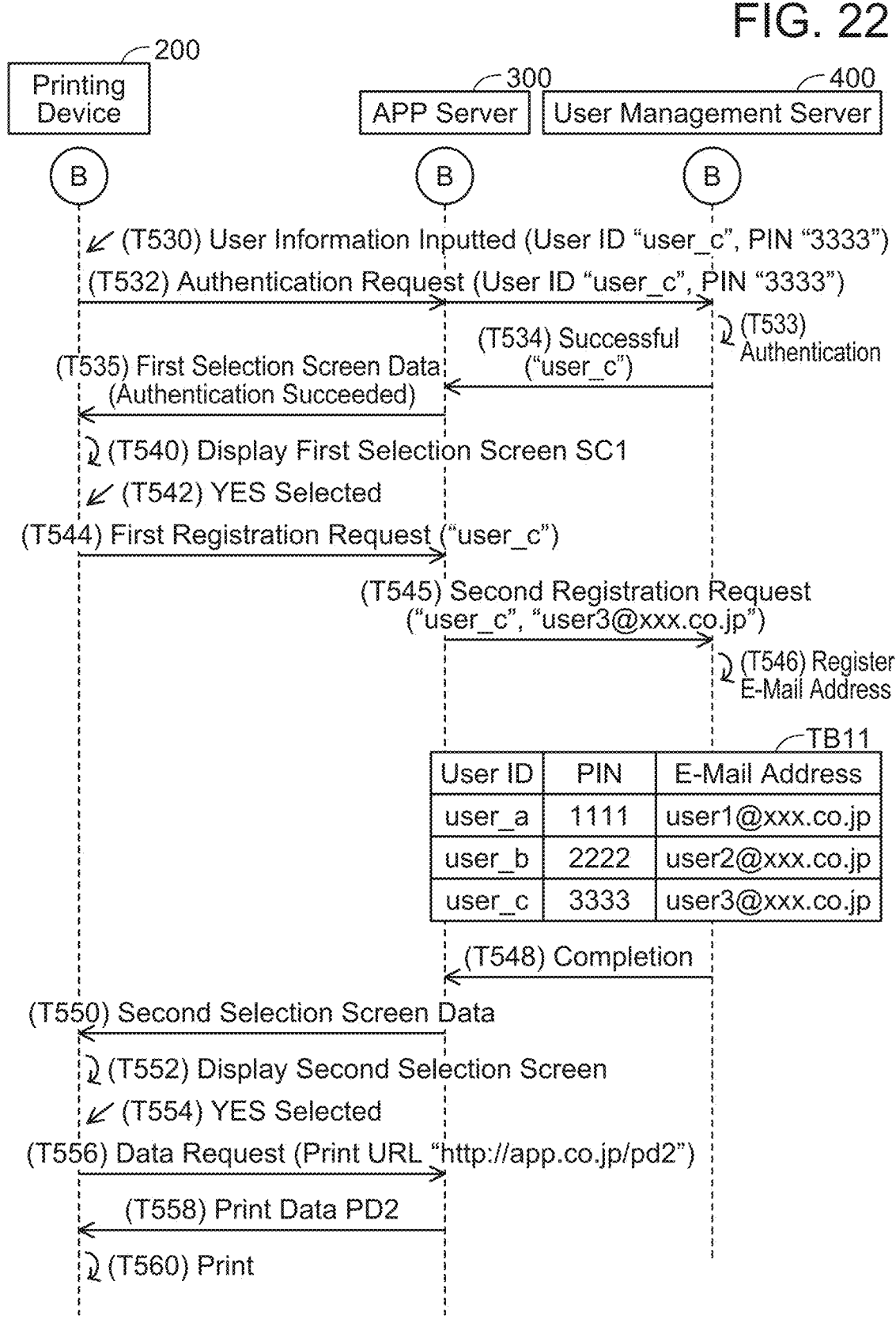
FIG. 22 shows a sequence diagram continued from FIG. 21.

Case E; FIGS. 21 and 22

Next, Case E in which a sender e-mail address is not registered yet in the user table TB11 will be described with reference to FIGS. 21 and 22.

When receiving an e-mail EM2 from the terminal device 600 in T500, the APP server 300 sends an inquiry including the e-mail address "user3@xxx.co.jp" and the subject "user_c" to the user management server 400 in T502.

When receiving the inquiry from the APP server 300 in T502, the user management server 400 determines that the e-mail address "user3@xxx.co.jp" is not in the user table TB11, and determines that the subject "user_c" includes the user ID "user_c" registered in the user table TB11. As such, in T504, the user management server 400 sends to the APP server 300 an inquiry result indicating that the e-mail address "user3@xxx.co.jp" is not in the user table TB11 and the subject "user_c" includes the user ID "user_c" registered in the user table TB11. This inquiry result includes the user ID "user_c".

A process of T510 is similar to the process of T410 of FIG. 20 except that the respective types of information stored in the provisional registration table TB12 in association with each other are different. Processes of T520 and T522 are similar to the processes of T420 and T422 except that the user ID and the print URL are different. As above, even when the target e-mail address is not in the user table TB11, the APP server 300 sends the print instruction including the target print URL to the printing device 200 in the case where the target subject includes the user ID in the user table TB11. Thus, the printing device 200 can print the image.

Continuation of FIG. 21; FIG. 22

A process of T530 of FIG. 22 is similar to the process of T230 of FIG. 16. Further, processes of T532 and T533 are similar to the processes of T442 and T443 of FIG. 20 except that user information to be authenticated is different.

When receiving a response indicating that the authentication was successful in T534, the APP server 300 determines that the authentication of the user information was successful (YES in S400 of FIG. 19). Further, the APP server 300 determines that the user ID "user_c" included in the received response is in the provisional registration table TB12 (YES in S402) and determines that the candidate flag "YES" is stored in association with this user ID (YES in S410). As such, in T535, the APP server 300 sends to the printing device 200 the first selection screen data representing the first selection screen SC1 and the response indicating that the authentication was successful (S412). As above, by sending the first selection screen data to the printing device 200, the APP server 300 can allow the user to select whether to register the candidate e-mail address in the user table TB11.

When receiving the first selection screen data in T535, the printing device 200 displays the first selection screen SC1 in T540. When accepting the selection of the YES button in the first selection screen SC1 in T542, the printing device 200 sends a first registration request including the user ID "user_c" to the APP server 300 in T544.

When receiving the first registration request in T544 (YES in S414), the APP server 300 sends a second registration request to the user management server 400 in T545 (S416). The second registration request includes the user ID "user_c" and the candidate e-mail address "user3@xxx.co.jp" associated with this user ID.

When receiving the second registration request in T545, the user management server 400 registers the candidate e-mail address "user3@xxx.co.jp" in the user table TB11 in association with the user ID "user_c" in T546. As above, the user can easily register the e-mail address to the user table TB11 even without inputting the e-mail address to the printing device 200. Then, in T548, the user management server 400 sends information indicating that the registration of the e-mail address has been completed to the APP server 300.

When receiving the information indicating that the registration of the e-mail address has been completed in T548, the APP server 300 sends the second selection screen data representing the second selection screen SC2 to the printing device 200 in T550 (S420). As above, by sending the second selection screen data to the printing device 200, the APP server 300 can allow the user to select whether to print the image represented by the print data PD2.

When receiving the second selection screen data in T550, the printing device 200 displays the second selection screen SC2 in T552. Processes of T552 to T560 are similar to the processes of T240 to T254 of FIG. 16.

Effects of Present Embodiment

According to the above configuration, when receiving the e-mail including the image data, the APP server 300 determines whether or not the sender e-mail address of the e-mail is in the user table TB11. In the case of determining that the sender e-mail address is in the user table TB11, the APP server 300 sends the print instruction to the printing device 200. As a result, the image represented by the image data is printed in the printing device 200 in the case where the inputted user information is identical to the registered user information including the registered user ID. Thus, the security can be enhanced in the situation where the target image represented by the image data included in the e-mail is to be printed.

Corresponding Relationships

The combination of the APP server 300 and the user management server 400 is an example of "server". The print data PD2 is an example of "second relation information". The print instruction in T420 of FIG. 20 and the print instruction in T520 of FIG. 21 are respectively examples of "first print instruction" and "second print instruction". Corresponding relationships between the respective processes in the above embodiment and the respective processes executed by "controller" of "server" will be described. The process of S300, the process of S302, and the process of S306 of FIG. 18 are respectively examples of "receive an e-mail", "determine whether a sender e-mail address of the e-mail is in a table", and "send a first print instruction". The process of S308 and the process of S422 of FIG. 19 are examples of "receive a data request". The process of S310 and the process of S430 are examples of "send the image data". The process of S320, the process of S322, and the process of S324 are respectively examples of "determine whether a subject of the e-mail includes a user ID registered in the table", "store the sender e-mail address (and "store second relation information")", and "send a second print instruction". The process of S330 is an example of "receive the inputted user information". The process of S400, the process of S412, and the process of S420 are respectively examples of "determine whether the inputted user information is identical to the registered user information in the table", "send first screen data", and "send second screen data".

Fifth Embodiment

A fifth embodiment is similar to the fourth embodiment except that the processes of S306 to S310 of FIG. 18 are not executed and the CPU 332 proceeds to S530 in the case of determining NO in S410 of FIG. 19. That is, when the APP server 300 stores the target print data in S304, it terminates the process of FIG. 18 without executing the processes of S306 to S310. Further, when the APP server 300 determines NO in S410, it proceeds to the process of S530 instead of proceeding to the process of S411.

In S530, the CPU 332 sends to the printing device 200 a print instruction including the response indicating that the authentication was successful and the target print data. As a result, in the printing device 200, the image represented by the target image data is printed due to the response indicating that the authentication was successful having been received and the target print data having been received (S530). When the process of S530 is completed, the process of FIG. 19 is terminated.

Figure 23:
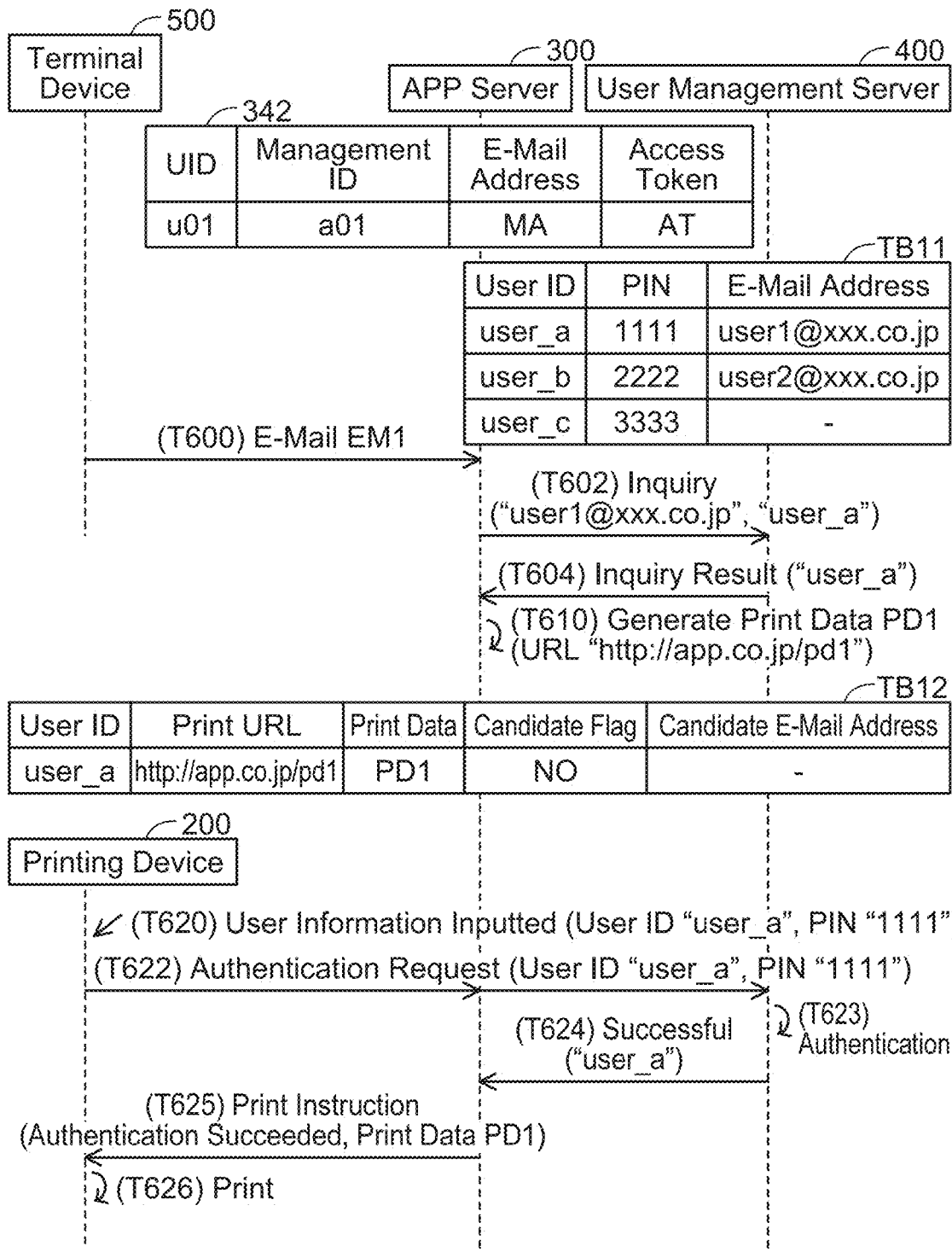
FIG. 23 shows a sequence diagram of Case F of the fifth embodiment.

Case F; FIG. 23

Next, Case F realized by the present embodiment will be described with reference to FIG. 23. Processes of T600 to T610 of FIG. 23 are similar to the processes of T400 to T410 of FIG. 20. Further, processes of T620 to T624 are similar to the processes of T440 to T444.

In the present case, the APP server 300 determines that the user information was successfully authenticated (YES in S400 of FIG. 19), and determines that the user ID "user_a" included in the response is in the provisional registration table TB12 (YES in S402) and that the candidate flag "NO" is stored in association with this user ID (NO in S410). As such, the APP server 300 does not send the first or second selection screen data to the printing device 200, but sends to the printing device 200 a print instruction including the response indicating that the authentication was successful and the print data PD1 stored in association with the user ID "user_a" in T625 (S530). In a variant, in T625, the APP server 300 may send a print instruction including the print URL "http://app.co.jp/pd1" stored in association with the user ID "user_a" to the printing device 200. In this case, the printing device 200 may send a data request to the APP server 300 using the received print URL and receive the print data PD1 from the APP server 300 (see T430 and T432 of FIG. 20). A process of T626 is similar to the process of T446 of FIG. 20.

Effects of Present Embodiment

According to the above configuration, when receiving the e-mail including the image data, the APP server 300 determines whether or not the sender e-mail address of the e-mail is in the user table TB11. In the case of determining that the sender e-mail address is in the user table TB11 and the inputted user information is identical to the registered user information including the registered user ID, the APP server 300 sends the print instruction to the printing device 200. As a result, in the printing device 200, the image represented by the image data is printed. Thus, the security can be enhanced in the situation where the target image represented by the image data included in the e-mail is to be printed.

Further, in the case where the authentication of the user information is successful (YES in S400 of FIG. 19), the APP server 300 sends the print instruction including the print data PD1 to the printing device 200 (S530). As a result, in the printing device 200, the image represented by this print data PD1 is printed. As above, since the APP server 300 sends the print data PD1 to the printing device 200 immediately before the printing is executed in the printing device 200, the printing device 200 does not need to store the print data PD1 over a long period of time. Due to this, the memory capacity for storing the print data in the printing device 200 can be small. Further, the communication of the print data PD1 is not executed between the printing device 200 and the APP server 300 before the user information is successfully authenticated. This can reduce an increase in the communication load on the network to which the printing device 200 belongs.

Corresponding Relationships

The print data PD1 is an example of "first relation information". The print instruction in T625 of FIG. 23 is an example of "first print instruction". The process of S530 of FIG. 19 is an example of "send a first print instruction".

(Variant 1) After determining YES in S102 of FIG. 12, the printing device 200 registers the registered user ID, the target print data, and the candidate flag "NO" in the provisional registration table TB12 in association with each other in S104. In this variant, the processes of S106 to S110 are not executed. Further, after determining NO in S102 and YES in S120 of FIG. 12, the printing device 200 stores the specific user ID, the target print data, the candidate flag "YES", and the target e-mail address in the provisional registration table TB12 in association with each other in S122. In this variant, the target print data is an example of "first relation information" and "second relation information". Further, in this variant, "send a data request", "receive the image data", and "store the image data" executed by "printing device" may be omitted. Further, in S306 and S324 of FIG. 18, the APP server 300 may send to the printing device 200 a print instruction including the target print data instead of the print instruction including the target print URL. In this variant, the processes of S308 to S310 are not executed. In this variant, the target print data is examples of "first relation information" and "second relation information". In this variant, "receive a data request" and "send the image data" executed by "server" may be omitted.

(Variant 2) In S100 of FIG. 12, the printing device 200 may receive from the APP server 300, instead of the print instruction including the target print URL, a print instruction including the image data itself included in the e-mail which the APP server 300 received. In this case, after determining YES in S102 of FIG. 12, the printing device 200 converts this image data to print data. Then, in S104, the printing device 200 registers the registered user ID, this print data, and the candidate flag "NO" in the provisional registration table TB12 in association with each other. The processes of S106 to S110 are not executed. After determining NO in S102 and YES in S120 of FIG. 12, the printing device 200 converts the image data to print data. Then, in S122, the printing device 200 stores the specific user ID, this print data, the candidate flag "YES", and the target e-mail address in the provisional registration table TB12 in association with each other. In this variant, the image data is examples of "first relation information" and "second relation information". Further, in this variant, "send a data request" and "receive the image data" executed by "printing device" may be omitted. Further, in S306 and S324 of FIG. 18, the APP server 300 may send to the printing device 200, instead of the print instruction including the target print URL, a print instruction including the target print data itself included in the e-mail which the APP server 300 received. In this variant, the processes of S308 to S310 are not executed. In this variant, the target print data is examples of "first relation information" and "second relation information". In this variant, "receive a data request" and "send the image data" executed by "server" may be omitted.

(Variant 3) In S100 of FIG. 12, instead of receiving the print instruction including the target print URL, the printing device 200 may receive, from the APP server 300, a print instruction including the URL that indicates the location of the image data in the APP server 300. The image data is included in the e-mail which the APP server 300 had received. In this variant, the URL corresponding to the image data as above is an example of "location information".

(Variant 4) After receiving the print instruction in S100 of FIG. 12, the printing device 200 may skip the processes of S102 and S104, and send the data request to the APP server 300 in S106 by using the print URL included in the print instruction received in S100. In this case, the printing device 200 executes the process of S102 after having received the print data in S108. In the case of determining YES in S102, the printing device 200 stores in the provisional registration table TB12 the registered user ID, the received print data, and the candidate flag "NO" in association with each other, and does not store the received print data. In general terms, a timing when "send a data request" is executed by "printing device" is not limited to the timings in the above embodiments.

(Variant 5) In the case of determining NO in S102 of FIG. 12, the printing device 200 may terminate the process of FIG. 12 without executing the processes of S120 or S122. In this variant, "determine whether the subject includes a user ID registered in the table", "in a case where it is determined that the subject includes a specific user ID registered in the table, cause the printing unit to print the target image", "store the sender e-mail address", and "store second relation information" executed by "printing device" may be omitted. Further, the APP server 300 may terminate the process of FIG. 18 without executing the processes of S320 or S322 in the case of determining NO in S302 of FIG. 18. In this variant, "determine whether a subject of the e-mail includes a user ID registered in the table", "send a second print instruction", "store the sender e-mail address", and "store second relation information" executed by "server" may be omitted.

(Variant 6) In the case of determining YES in S202 of FIG. 13, the printing device 200 may proceed to the process of S230 without executing the process of S210 to S222. In this variant, "display a first selection screen", "register the sender e-mail address", and "display a second selection screen" executed by "printing device" may be omitted. In another variant, in the case of determining YES in S210, the printing device 200 may proceed to the process of S220 without executing the process of S212 to S216. In this variant, "display a first selection screen" and "register the sender e-mail address" executed by "printing device" may be omitted. In another variant, the printing device 200 may skip the processes of S220 and S222 and proceed to S230 after having executed the process of S216. In this variant, "display a second selection screen" executed by "printing device" may be omitted. Further, in the case of determining YES in S402 of FIG. 19, the APP server 300 may proceed to the process of S422 without executing the processes of S410 to S420. In this variant, "send first screen data", "register the sender e-mail address", and "send second screen data" executed by the "server" may be omitted. In another variant, in the case of determining YES in S410, the APP server 300 may proceed to the process of S420 without executing the processes of S412 to S416. In this variant, "send first screen data" and "register the sender e-mail address" executed by the "server" may be omitted. In another variant, the APP server 300 may omit the process of 420 and proceed to S422 after having executed the process of S416. In this variant, "send second screen data" executed by the "server" may be omitted.

(Variant 7) The APP server 300 may not execute the process of S308 or S310 after the process of S306 of FIG. 18 is executed. In this case, the APP server 300 may execute the processes of S308 and S310 in the case of determining NO in S410 of FIG. 19. That is, the APP server 300 may determine whether the data request has been received after the authentication of the user information has been executed. In general terms, a timing when "receive a data request" is executed by "server" is not limited to the timings in the above embodiments.

(Variant 8) The APP server 300 and the user management server 400 may be configured as an integrated server. In this variant, this integrated server is an example of "server".

(Variant 9) In the respective embodiments as above, the respective processes in FIGS. 11 to 23 are realized by software (e.g., programs 240, 340, 440), however, at least one of these processes may be realized by hardware such as a logic circuit.

What is claimed is:

1. A printing device comprising:
   a printing unit configured to print an image on a recording medium;
   a communication interface;
   an input unit to which a user ID and a password are inputted; and
   a memory; and
   a controller configured to access a table in which a user ID and an e-mail address are registered in association with each other,
   wherein the controller is configured to:
   receive an e-mail to which attached data is attached via the communication interface;
   in a case where the e-mail is received via the communication interface, determine whether a sender e-mail address of the e-mail is in the table;
   in a case where it is determined that the sender e-mail address is in the table, obtain a user ID associated with the sender e-mail address from the table and store the attached data in the memory in association with the obtained user ID;
   accept an input of the user ID and the password to the input unit;
   authenticate the user ID and the password which are inputted to the input unit; and cause the printing unit to print the attached data, the attached data being stored in the memory in association with the authenticated user ID.

2. The printing device as in claim 1, wherein the controller is further configured to:
in a case where it is determined that the sender e-mail address is not in the table, determine whether a subject of the e-mail includes a user ID registered in the table; and
in a case where it is determined that the subject includes the user ID registered in the table, store the user ID included in the subject, the sender e-mail address, and the attached data in the memory in association with each other.

3. The printing device as in claim 2, further comprising a display unit configured to display an image,
wherein the controller is configured to:
in the case where it is determined that the subject includes the user ID registered in the table, register the user ID included in the subject, the sender e-mail address, and the attached data in a provisional registration table in the memory, the provisional registration table being different from the table;
in a case where the authenticated user ID and the user ID registered in the provisional registration table are identical to each other, display a first screen on the display unit, the first screen being for selecting whether to register in the table the sender e-mail address registered in the provisional registration table; and
in a case where information indicating that the sender e-mail address is to be registered in the table is inputted to the input unit, register the sender e-mail address registered in the provisional registration table in the table in association with the authenticated user ID.

4. The printing device as in claim 3, wherein the controller is further configured to:
in a case where it is determined that the subject does not include the user ID registered in the table, delete the e-mail and the attached data attached to the e-mail.

5. The printing device as in claim 3, wherein the controller is further configured to:
in a case where information indicating that the sender e-mail address registered in the provisional registration table is not to be registered in the table is inputted to the input unit, display a second screen on the display unit without registering the sender e-mail address in the table, the second screen being for selecting whether to print the attached data associated with the authenticated user ID; and
in a case where information indicating that the attached data is to be printed is inputted to the input unit, cause the printing unit to print the attached data.

6. The printing device as in claim 1, wherein the table is stored in the memory.

7. The printing device as in claim 1, wherein the table is stored in a server which is capable of communicating with the printing device.

8. A printing device comprising:
a printing unit configured to print an image on a recording medium;
a communication interface;
an input unit to which a user ID and a password are inputted; and
a controller,
wherein the controller is configured to:
in a case where an e-mail to which attached data representing a target image to be printed is attached is received by a server, receive a print instruction from the server via the communication interface, the print instruction including a sender e-mail address of the e-mail and first relation information related to the attached data;
in a case where the print instruction is received, determine whether the sender e-mail address included in the print instruction is in a table in which a user ID and an e-mail address are registered in association with each other;
accept an input of the user ID and the password to the input unit; and
in a case where it is determined that the sender e-mail address is in the table and an inputted user ID and an inputted password which are inputted to the input unit are identical to a registered user ID and a registered password which are registered in the table in association with the sender e-mail address, cause the printing unit to print the target image which is represented by the attached data related to the first relation information included in the print instruction.

9. The printing device as in claim 8, further comprising a memory that stores the table,
wherein the controller is further configured to determine whether the inputted user ID and the inputted password are identical to the registered user ID and the registered password in the table.

10. The printing device as in claim 8, wherein
the first relation information includes location information indicating a location in the server, and
the controller is further configured to:
in a case where it is determined that the sender e-mail address is in the table, send a data request to the server using the first relation information that is the location information via the communication interface, the data request being for requesting the server to send image data obtained using the attached data; and
in a case where the data request is sent, receive the image data from the server via the communication interface.

11. The printing device as in claim 10, further comprising a memory,
wherein the data request is sent to the server after the print instruction has been received and before the inputted user ID and the inputted password are inputted to the input unit,
the controller is further configured to, in the case where it is determined that the sender e-mail address is in the table, store the image data in the memory in association with the registered user ID, and
the controller is configured to, in a case where the inputted user ID and the inputted password are inputted to the input unit after the image data has been stored in the memory in association with the registered user ID and the inputted user ID and the inputted password are identical to the registered user ID and the registered password, cause the printing unit to print the target image using the image data stored in the memory in association with the registered user ID.

12. The printing device as in claim 10, wherein the controller is configured to, in the case where the inputted user ID and the inputted password are inputted to the input unit and the inputted user ID and the inputted password are identical to the registered user ID and the registered password, send the data request to the server.

13. The printing device as in claim 8, wherein
the print instruction further includes a subject of the e-mail, and
the controller is further configured to:

in a case where it is determined that the sender e-mail address is not in the table, determine whether the subject includes a user ID registered in the table; and in a case where it is determined that the subject includes a specific user ID registered in the table, cause the printing unit to print the target image which is represented by the attached data related to the first relation information included in the print instruction.

14. The printing device as in claim 13, further comprising a memory and a display unit, wherein the controller is further configured to:

in a case where it is determined that the subject includes the specific user ID registered in the table, store the sender e-mail address in the memory in association with a specific user ID that is registered in the table;

in a case where the inputted user ID and the inputted password are identical to the specific user ID and a specific password, display a first selection screen on the display unit, the first selection screen being for selecting whether to register in the table the sender e-mail address which is stored in the memory in association with the specific user ID; and in a case where it is selected on the first selection screen that the sender e-mail address is to be registered in the table, register the sender e-mail address in the table in association with the specific user ID.

15. The printing device as in claim 13, further comprising a memory and a display unit, wherein the controller is further configured to:

in the case where it is determined that the subject includes the specific user ID registered in the table, store second relation information related to the first relation information in the memory in association with a specific user ID that is registered in the table; and in the case where the inputted user ID and the inputted password are identical to the specific user ID and a specific password, display a second selection screen on the display unit, the second selection screen being for selecting whether to cause the printing unit to print the target image using the second relation information stored in the memory in association with the specific user ID, and in a case where it is selected on the second selection screen that the printing unit is to be caused to print the target image, the printing unit is caused to print the target image.

16. A server comprising:

a communication interface; and a controller, wherein the controller is configured to:

receive an e-mail to which attached data representing a target image to be printed is attached via the communication interface;

in a case where the e-mail is received, determine whether a sender e-mail address of the e-mail is in a table in which a user ID and an e-mail address are registered in association with each other; and in a case where it is determined that the sender e-mail address is in the table, send a first print instruction including first relation information related to the attached data to a printing device via the communication interface, the first print instruction being for causing the printing device to print the target data represented by the attached data related to the first relation information in a case where an inputted user ID and an inputted password inputted to the printing device are identical to a registered user ID and a registered password registered in the table in association with the sender e-mail address.

17. The server as in claim 16, further comprising a memory that stores the table, wherein the controller is further configured to:

in a case where the inputted user ID and the inputted password are inputted to the printing device, receive the inputted user ID and the inputted password from the printing device via the communication interface; and in a case where the inputted user ID and the inputted password is are received, determine whether the inputted user ID and the inputted password are identical to the registered user ID and the registered password in the table.

18. The server as in claim 16, wherein the first relation information includes location information indicating a location in the server, and the controller is further configured to:

after the first print instruction has been sent to the printing device, receive a data request for requesting sending of image data obtained using the attached data from the printing device via the communication interface, the first relation information that is the location information being used in the data request; and in a case where the data request is received, send the image data to the printing device via the communication interface.

19. The server as in claim 16, wherein the first relation information includes image data obtained using the attached data.

20. The server as in claim 16, wherein the controller is further configured to:

in a case where it is determined that the sender e-mail address is not in the table, determine whether a subject of the e-mail includes a user ID registered in the table; and in a case where it is determined that the subject includes a specific user ID registered in the table, send a second print instruction including the first relation information to the printing device via the communication interface, the second print instruction being for causing the printing device to print the target data represented by the attached data related to the first relation information.

21. The server as in claim 20, further comprising a memory, wherein the controller is further configured to:

in a case where it is determined that the subject includes the specific user ID registered in the table, store the sender e-mail address in the memory in association with a specific user ID registered in the table;

in a case where the inputted user ID and the inputted password are identical to the specific user ID and a specific password, send first screen data to the printing device via the communication interface, the first screen data representing a first selection screen, the first selection screen being for selecting whether to register, in the table, the sender e-mail address stored in the memory in association with the specific user ID; and in a case where it is selected to register the sender e-mail address in the table on the first selection screen displayed on the printing device, register the sender e-mail address in the table in association with the specific user ID.

22. The server as in claim 20, further comprising a memory, wherein the controller is further configured to:

in the case where it is determined that the subject includes the specific user ID registered in the table, store second relation information related to the first relation information in the memory in association with the specific user ID registered in the table; and in the case where the inputted user ID and the inputted password are identical to the specific user ID and a specific password, send second screen data to the printing device via the communication interface, the second screen data representing the second selection screen, the second selection screen being for selecting whether to cause the printing device to print the target image using the second relation information stored in association with the specific user ID in the memory, wherein in a case where it is selected to cause the printing device to print the target image on the second selection screen displayed on the printing device, the target image is printed by the printing device.

23. A server comprising:

a communication interface; and a controller, wherein the controller is configured to:

receive an e-mail to which attached data representing a target image to be printed is attached via the communication interface;

in a case where the e-mail is received, determine whether a sender e-mail address of the e-mail is in a table in which a user ID and an e-mail address are registered in association with each other; and in a case where it is determined that the sender e-mail address is in the table and an inputted user ID and an inputted password inputted to the printing device are identical to a registered user ID and a registered password registered in the table in association with the sender e-mail address, send a first print instruction including first relation information related to the attached data to the printing device via the communication interface, the first print instruction being for causing the printing device to print the target data represented by the attached data related to the first relation information.

* * * * *